US011781450B2

(12) United States Patent
Siefker et al.

(10) Patent No.: US 11,781,450 B2
(45) Date of Patent: Oct. 10, 2023

(54) SYSTEMS AND METHODS FOR A POPPET VALVE ASSEMBLY

(71) Applicant: HUSCO Automotive Holdings LLC, Waukesha, WI (US)

(72) Inventors: Jessica Siefker, Pleasant Ridge, MI (US); Anthony Barr, Birmingham, MI (US); Debora Manther, Royal Oak, MI (US); Austin Schmitt, Hartland, WI (US); Alexander Schlarmann, Watertown, WI (US); Michael Kujak, Hartland, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 233 days.

(21) Appl. No.: 17/010,034

(22) Filed: Sep. 2, 2020

(65) Prior Publication Data

US 2021/0062687 A1 Mar. 4, 2021

Related U.S. Application Data

(60) Provisional application No. 63/025,015, filed on May 14, 2020, provisional application No. 62/895,332, filed on Sep. 3, 2019.

(51) Int. Cl.
*F16K 31/16* (2006.01)
*F01L 1/344* (2006.01)
(Continued)

(52) U.S. Cl.
CPC .............. *F01L 1/344* (2013.01); *F16K 31/16* (2013.01); *F16K 31/523* (2013.01);
(Continued)

(58) Field of Classification Search
CPC ... F01L 1/344; F01L 2250/02; F01L 2250/04; F01L 2250/06; F16K 31/16;
(Continued)

(56) References Cited

U.S. PATENT DOCUMENTS 1,756,834 A 4/1930 Robertson
2,441,253 A * 5/1948 Sarver ............... F16K 31/52416
251/258

(Continued)

FOREIGN PATENT DOCUMENTS

DE 102016201246 A1 8/2017
DE 102013107293 B4 2/2020
(Continued)

OTHER PUBLICATIONS

3dMedLab. 3d-printed Bistable Compliant Switch Mechanism. Youtube Video. Mar. 22, 2019. Available online at https://www.youtube.com/watch?v=2vnsXrmVDB0&feature=youtu.be. 2 pages.
(Continued)

*Primary Examiner* — David Colon-Morales
*Assistant Examiner* — Andrew J Rost
(74) *Attorney, Agent, or Firm* — Quarles & Brady LLP

(57) ABSTRACT

The present disclosure provides a valve assembly including one or more poppet valves. In general, the valve assembly can have one or more poppet assemblies selectively actuatable between a first end position and a second end position. According to some aspects, a crankshaft assembly can be coupled to the one or more poppet assemblies and the crankshaft assembly can selectively actuate the one or more poppet assemblies between the first end position and the second end position.

17 Claims, 22 Drawing Sheets

(51) Int. Cl.
*F16K 31/52* (2006.01)
*F16K 31/528* (2006.01)

(52) U.S. Cl.
CPC ....... *F16K 31/5286* (2013.01); *F01L 2250/02* (2013.01); *F01L 2250/04* (2013.01); *F01L 2250/06* (2013.01)

(58) Field of Classification Search
CPC .. F16K 31/523; F16K 31/5286; F16K 31/528; F16K 31/52; F16K 31/52416; F16K 11/166; F16K 11/161; F16K 1/36; F16K 2200/3051; F16K 2200/3052; F16K 2200/302; F16K 2200/30
USPC .... 137/636, 628, 627.5, 627, 630.19, 630.2, 137/630, 862, 883, 861, 871
See application file for complete search history.

(56) References Cited

U.S. PATENT DOCUMENTS

| | | | |
|---|---|---|---|
| 3,118,390 A | | 1/1964 | Kinsley |
| 3,220,695 A | | 11/1965 | Downey |
| 3,352,419 A | | 11/1967 | Entringer et al. |
| 3,477,693 A | | 11/1969 | Bezanis |
| 4,580,533 A | * | 4/1986 | Oda .......... F01L 1/344 123/90.48 |
| 4,582,029 A | * | 4/1986 | Masuda ........ F01L 1/344 123/90.35 |
| 4,610,192 A | * | 9/1986 | Hartley ........ F01B 11/00 137/15.01 |
| 5,016,581 A | * | 5/1991 | Parsons ........ F01L 13/0015 74/519 |
| 5,500,113 A | * | 3/1996 | Hartley ........ B01D 61/10 417/403 |
| 5,505,593 A | * | 4/1996 | Hartley ........ F01B 11/004 417/393 |
| 5,599,003 A | | 2/1997 | Seemann |
| 6,308,673 B1 | * | 10/2001 | Kobayashi ........ F01L 1/344 123/90.38 |
| 6,415,753 B1 | * | 7/2002 | Nagaosa ........ F01L 13/0042 123/90.19 |
| 6,474,281 B1 | * | 11/2002 | Walters ........ F01L 1/34406 123/90.17 |
| 9,068,668 B2 | | 6/2015 | Grover |
| 9,617,905 B2 | | 4/2017 | Seon et al. |
| 10,024,219 B2 | | 7/2018 | Lee |
| 10,161,291 B2 | | 12/2018 | Lee et al. |
| 10,161,536 B2 | | 12/2018 | Lee et al. |
| 10,294,852 B2 | | 5/2019 | Lee et al. |
| 10,443,756 B2 | | 10/2019 | Peterson |
| 10,465,575 B2 | | 11/2019 | Kelly et al. |
| 10,465,593 B2 | | 11/2019 | Koh et al. |
| 10,473,022 B2 | | 11/2019 | Lee |
| 10,549,603 B2 | | 2/2020 | Lee |
| 10,578,007 B2 | | 3/2020 | Lee |
| 10,619,552 B2 | | 4/2020 | Lee et al. |
| 10,627,008 B2 | | 4/2020 | Lee |
| 10,634,038 B2 | | 4/2020 | Lee |
| 10,704,454 B2 | | 7/2020 | Lee |
| 10,704,703 B2 | | 7/2020 | Lee et al. |
| 10,753,505 B2 | | 8/2020 | Lee |
| 10,760,474 B2 | | 9/2020 | Lee |
| 10,774,725 B2 | | 9/2020 | Dudar |
| 10,788,143 B2 | | 9/2020 | Biester et al. |
| 10,815,867 B2 | | 10/2020 | Kim et al. |
| 10,851,700 B2 | | 12/2020 | Lee |
| 10,890,103 B2 | | 1/2021 | Kim et al. |
| 10,890,104 B2 | | 1/2021 | Kim |
| 11,022,025 B1 | | 6/2021 | Lee |
| 2003/0042452 A1 | | 3/2003 | Burke |
| 2012/0222507 A1 | * | 9/2012 | Toennesmann ....... F02B 37/186 74/55 |
| 2012/0279462 A1 | | 11/2012 | Warnery et al. |
| 2015/0041006 A1 | | 2/2015 | Morishita |
| 2019/0078494 A1 | | 3/2019 | Lee et al. |
| 2019/0128173 A1 | | 5/2019 | Lee et al. |
| 2021/0231046 A1 | | 7/2021 | Park et al. |

FOREIGN PATENT DOCUMENTS

| | | |
|---|---|---|
| JP | 2006064023 A | 3/2006 |
| KR | 20100117909 A | 11/2010 |
| KR | 101403437 B1 | 6/2014 |
| KR | 101720568 B1 | 3/2017 |
| KR | 101744834 B1 | 6/2017 |
| WO | 2010039044 A2 | 4/2010 |
| WO | 2011061051 A1 | 5/2011 |
| WO | 2018068928 A1 | 4/2018 |

OTHER PUBLICATIONS

European Patent Office. Extended European Search Report for application 20194113.5. dated Dec. 23, 2020. 7 pages.

Qiu, J. et al. "A curved-beam bistable mechanism." Journal of microelectromechanical systems 13.2 (2004): 137-146.

* cited by examiner

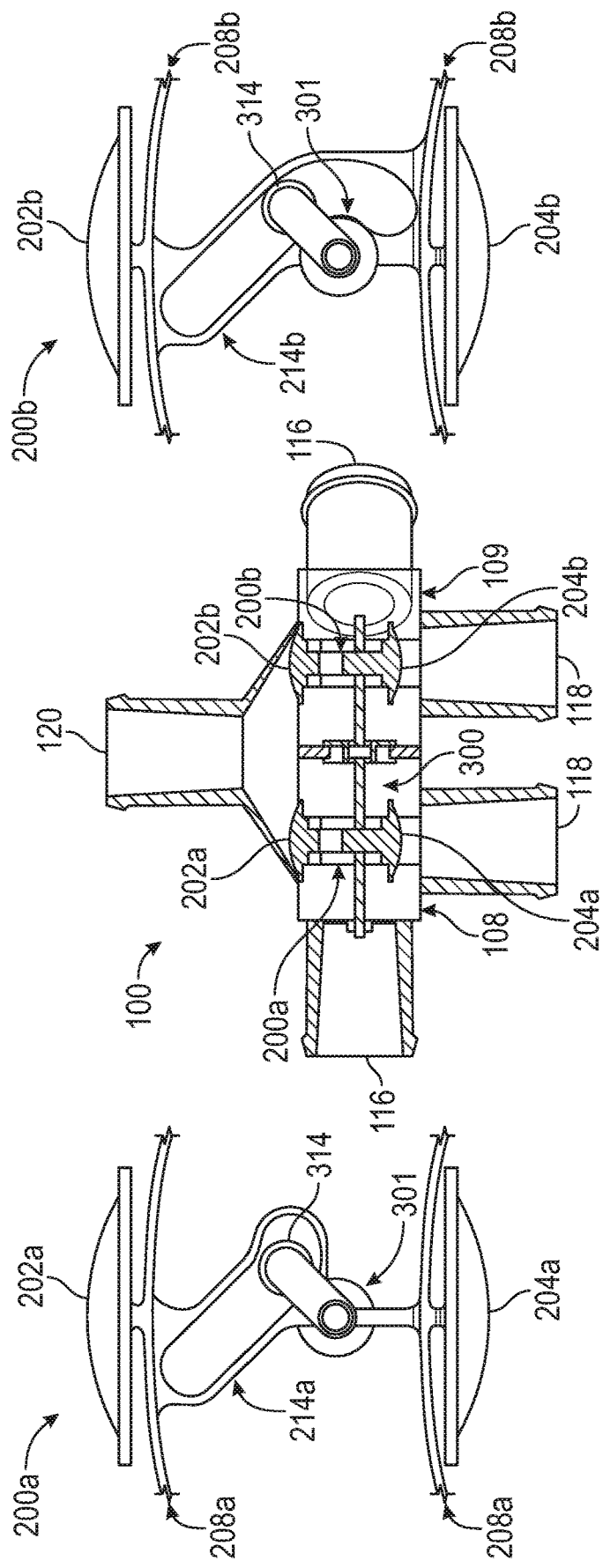

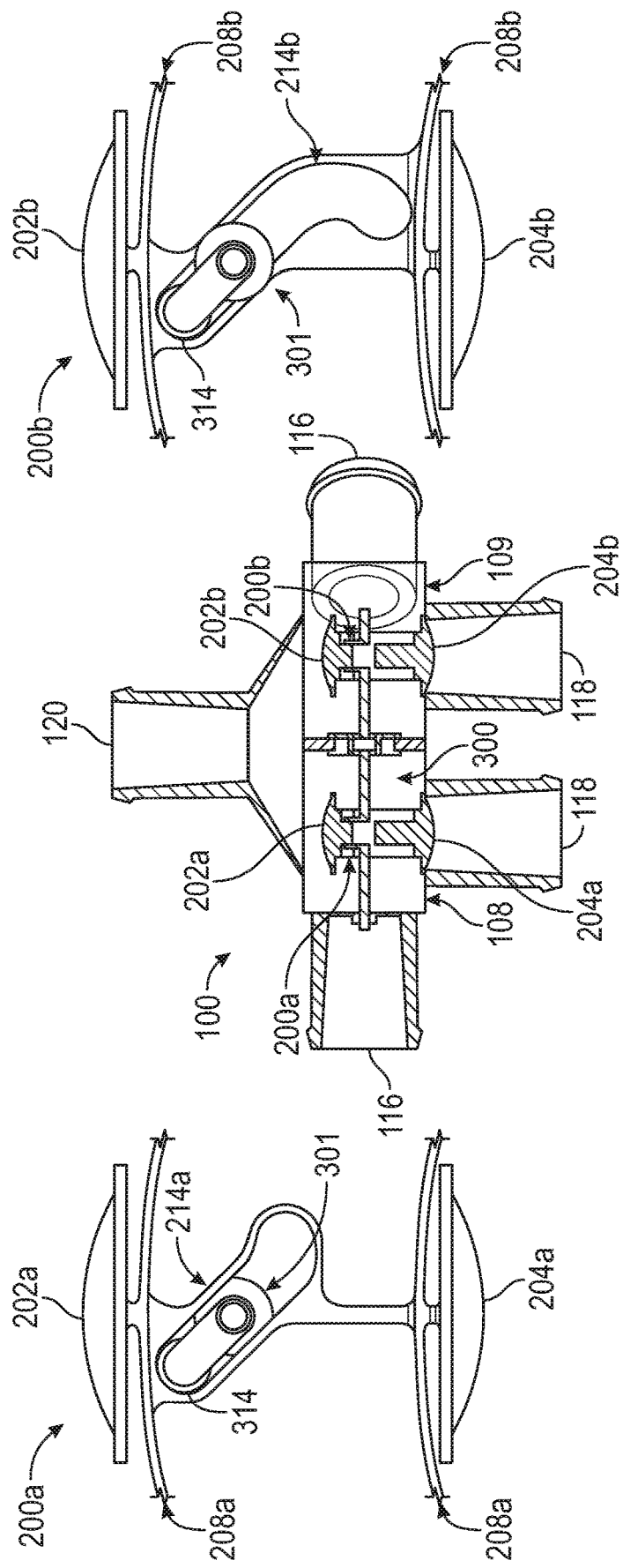

SYSTEMS AND METHODS FOR A POPPET VALVE ASSEMBLY

CROSS-REFERENCES TO RELATED APPLICATIONS

The present application is based on and claims priority to U.S. Provisional Patent Application No. 62/895,332, filed on Sep. 3, 2019, and U.S. Provisional Patent Application No. 63/025,015, filed on May 14, 2020, which are incorporated herein by reference in their entirety.

STATEMENT REGARDING FEDERALLY SPONSORED RESEARCH

Not Applicable.

BACKGROUND

Generally, poppet valves can include a poppet that is moveable between one or more positions to selectively provide or inhibit fluid flow along a one or more flow paths.

BRIEF SUMMARY

The present disclosure relates generally to a valve assembly including one or more poppet valves.

In some aspects, the present disclosure provides a valve assembly that includes a first poppet assembly having a first poppet and a crankshaft coupled to the first poppet assembly. The crankshaft being configured to selectively actuate the first poppet assembly between a first end position and a second end position. Rotation of the crankshaft in a first direction is configured to actuate the first poppet assembly from the first end position to the second end position, and rotation of the crankshaft in a second direction is configured to maintain the first poppet assembly in the first end position.

In some aspects, the present disclosure provides a valve assembly that includes a poppet assembly having a first poppet and a poppet support structure, a slot extending through the poppet support structure, and a crankshaft configured to actuate the poppet assembly between a first end position and a second end position. The crankshaft includes a crank pin that is slidably coupled to the slot. The slot defines a geometry that is configured to selectively displace the poppet assembly upon displacement of the crankshaft relative to the slot.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 6A is a side view of the first poppet assembly of FIG. 1 with the valve assembly in a first configuration.

FIG. 6B is a cross-sectional view of the valve assembly of FIG. 1 taken along line 6-6 with the valve assembly in a first configuration.

FIG. 6C is a side view of the second poppet assembly of FIG. 1 with the valve assembly in a first configuration.

FIG. 7A is a side view of the first poppet assembly of FIG. 1 with the valve assembly in a second configuration.

FIG. 7B is a cross-sectional view of the valve assembly of FIG. 1 taken along line 6-6 with the valve assembly in a second configuration.

FIG. 7C is a side view of the second poppet assembly of FIG. 1 with the valve assembly in a second configuration.

DETAILED DESCRIPTION

Figure 1:
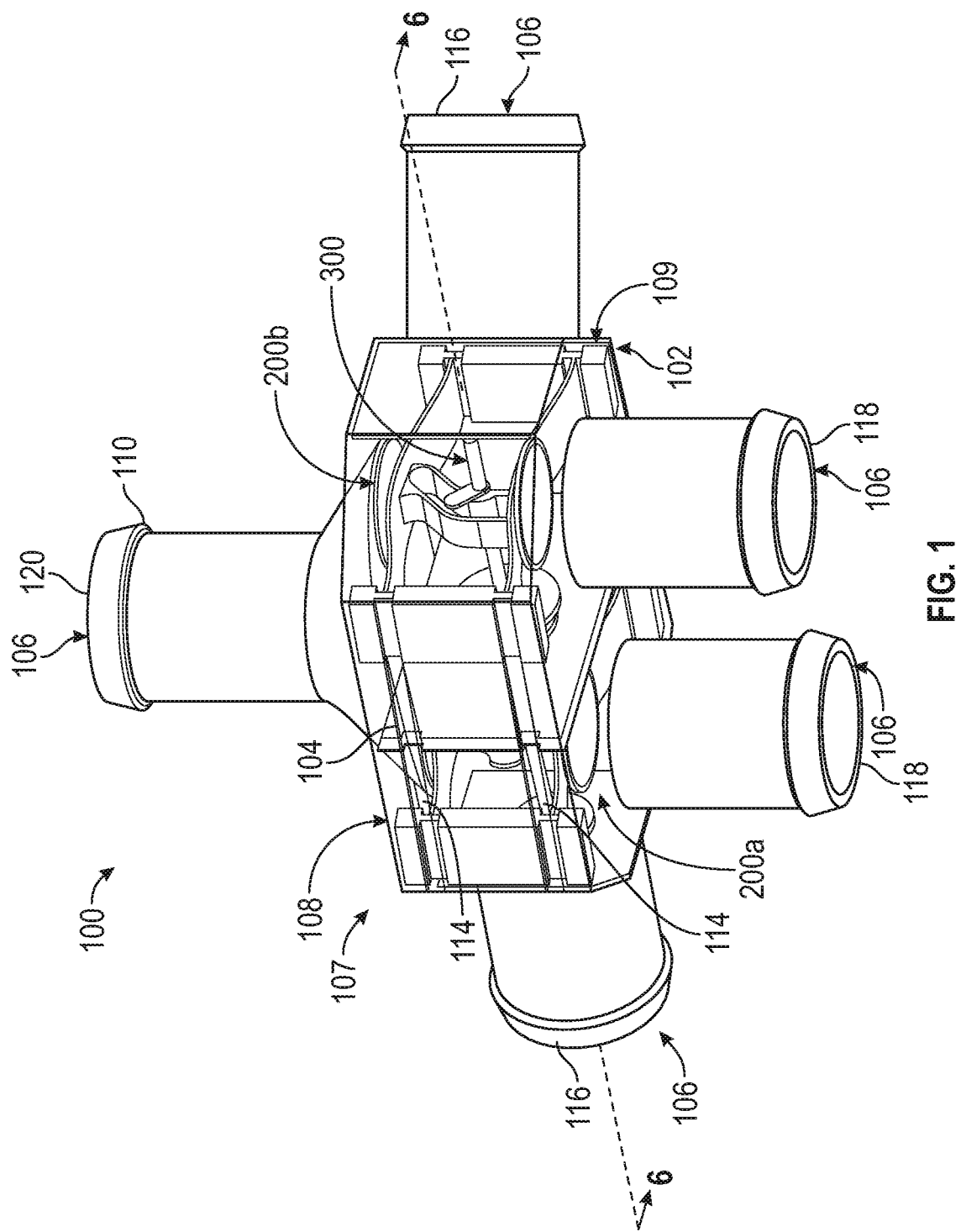
FIG. 1 is a perspective view of a valve assembly according to one aspect of the present disclosure with a valve housing illustrated as being transparent.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use herein of the term "axial" and variations thereof refers to a direction that extends generally along an axis of symmetry, a central axis, or an elongate direction of a particular component or system. For example, an axially-extending structure of a component can extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component can generally extend at least partly along a direction that is perpendicular to a longitudinal or central axis of that component. The use herein of the term "circumferential" and variations thereof refers to a direction that extends generally around a circumference or periphery of an object, around an axis of symmetry, around a central axis, or around an elongate direction of a particular component or system.

In general, as will be described in detail herein, a multi-stable poppet valve can include one or more poppets that can be selectively movable between one or more stable positions (e.g., the poppet remains in place without power being supplied to an actuator that is configured to move the poppet). For example, the multi-stable poppet valve can define two or more stable positions for the poppet. The selective movement of the poppets between the stable positions can facilitate the engagement or disengagement between the poppet and one or more end positions. For example, the poppets can be selectively moveable between two end positions and/or a position between the two end positions (i.e., a tri-stable poppet valve having three stable positions).

Conventional poppet valves typically require constant actuation power, or a magnet, as some non-limiting examples, to maintain a position of a poppet to prevent undesired fluid leakage between fluid ports. The multi-stable poppet valves described herein can overcome these deficiencies by providing a poppet valve assembly that can include a spring or beam attached to or integrated into a poppet valve assembly. According to some aspects of the present disclosure, a multi-stable poppet valves can include a poppet valve assembly with a torque reduction device arranged between a crankshaft and an actuator to provide a multi-stable poppet valve.

Multi-stable functionality can occur when the poppet remains in an end position, or any intermediary position, with zero actuation device power. For example, a position can be considered to be a stable position when the valve remains in the position without input, power, or engagement from an external or outside source, such as an actuator, as one non-limiting example. An end position can be defined as a position in which the poppet blocks fluid flow or inhibits fluid communication to or from a port (e.g., an inlet or an outlet). To move a poppet from a stable position, an actuation device can engage the poppet to move or displace the poppet. In some non-limiting examples, the poppet can be displaced until it reaches a predetermined displacement point or position. In some non-limiting examples, a compliant mechanism can force the poppet to snap into an opposite end position when the poppet reaches the predetermined displacement position. In each end position, the compliant mechanism can provide a biasing force that can be sufficient to achieve a required poppet seal force.

FIG. 1 illustrates one non-limiting example of a valve assembly 100 according to the present disclosure. The valve assembly 100 can include a valve housing 102 having one or more ports 106. In the illustrated non-limiting example, the valve assembly 100 can include one or more poppet assemblies 200 received within the valve housing. As will be described herein, the poppet assemblies 200 can be selectively moved or actuated between two or more positions via a crankshaft assembly 300 to provide or inhibit fluid communication to or from the one or more ports 106.

Figure 2:
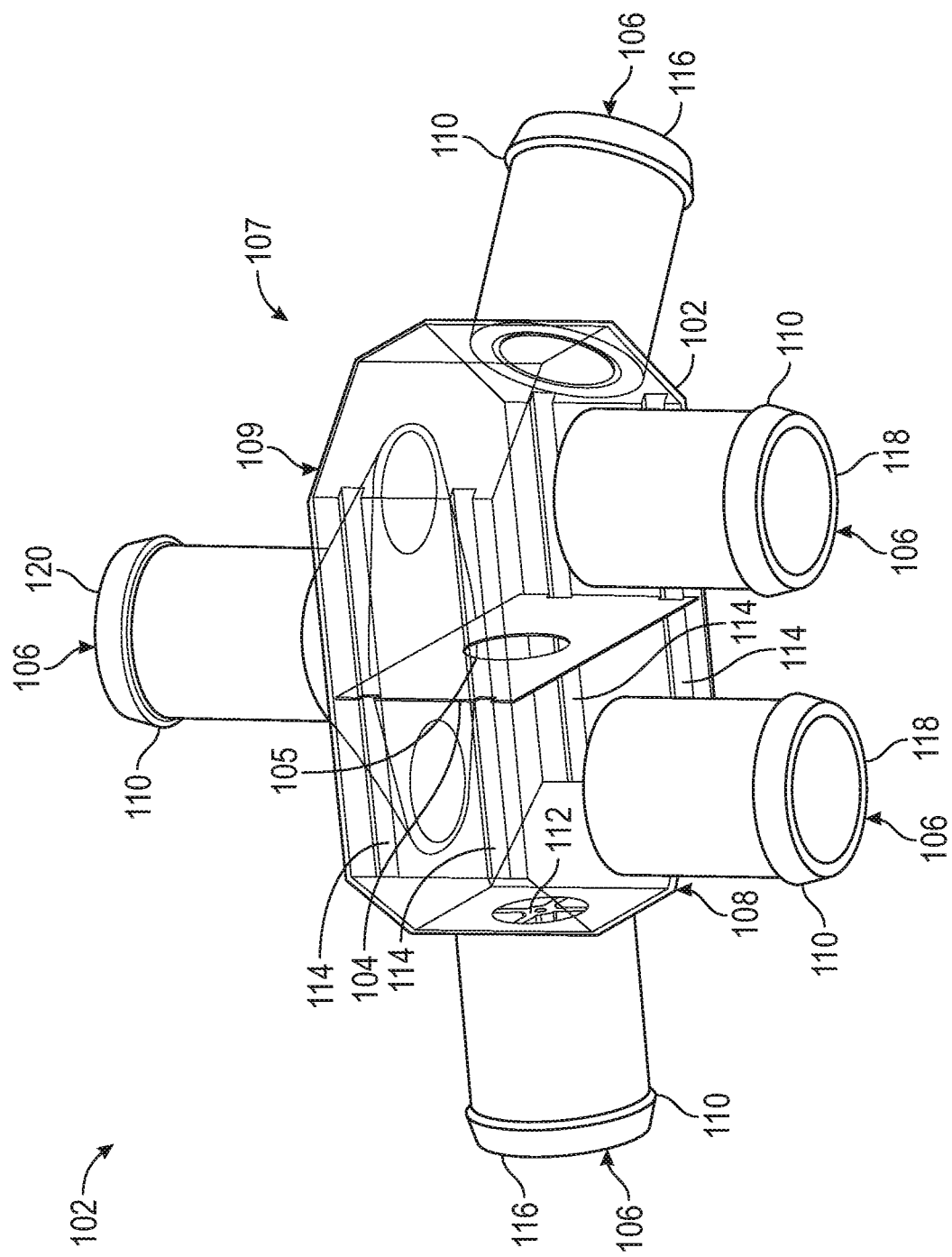
FIG. 2 is a perspective view of a valve housing of the valve assembly of FIG. 1 with the valve housing illustrated as being transparent.

As illustrated in FIGS. 1 and 2, the one or more ports 106 can be integral to the valve housing 102 and extend outwardly therefrom. In some non-limiting examples, the one or more ports 106 can be removably coupled to the valve housing 102. The valve housing 102 can include one or more valve sections 107. The one or more valve sections 107 can be separated by a dividing wall 104. The dividing wall 104 can include a bearing support aperture 105 located centrally within the dividing wall 104. In the illustrated non-limiting example, the valve housing 102 can include a first valve section 108 and a second valve section 109.

The valve housing 102 can include one or more valve guides 114. In the illustrated non-limiting example, the valve guides 114 extend away from sidewalls of the valve housing 102 and extend longitudinally along at least a portion of the first valve section 108 and the second valve section 109. In the illustrated non-limiting examples, the one or more valve guides 114 can include four valve guides 114 in the form of rails that protrude outward from opposing sidewalls (i.e., into an internal cavity of the valve housing 102), with two valve guides 114 being spaced apart from one another and arranged on one side of the valve housing 102 and the other two valve guides 114 being spaced apart and arranged on an opposing side of the valve housing 102.

In the illustrated non-limiting example, each of the first valve section 108 and the second valve section 109 can include a first port 116, a second port 118, and a third port 120. In the illustrated non-limiting example, the third port 120 can be a shared port. That is, the third port 120 can extend over the first valve section 108 and the second valve section 109 and be in fluid communication therewith. In some non-limiting examples, each of the first valve section 108 and the second valve section 109 can include an individual third port, rather than the illustrated shared third port 120. In general, the first port 116, second port 118, and third port 120 can provide a conduit for fluid to flow, or a flow path, through the valve housing 102. In some non-limiting examples, each of the one or more ports 106 can include a corresponding hose connector 110 that extends radially outward from a distal end thereof.

In the illustrated non-limiting example, each of the first valve section 108 and the second valve section 109 can include a poppet assembly 200. For example, the first valve section 108 can include a first poppet assembly 200a and the second valve section 109 can include a second poppet assembly 200b. The first poppet assembly 200a and the second poppet assembly 200b can be selectively moved or actuated between two or more positions via the crankshaft assembly 300. The crankshaft assembly 300 can extend at least partially through the valve housing 102 and can be rotatably coupled to the valve housing 102 such that the crankshaft can rotate relative to the valve housing 102. For example, the valve housing 102 can include a crankshaft end support 112 that can receive and support a portion of the crankshaft assembly 300. In general, the one or more poppet assemblies 200 can be coupled to the crankshaft assembly 300, such that the crankshaft assembly 300 can provide an input displacement to the one or more poppet assemblies 200. In some non-limiting examples, at least a portion of the crankshaft assembly 300 (e.g., a pin of the crankshaft) can extend through or be in engagement with each of the one or more poppet assemblies 200.

Figure 3:
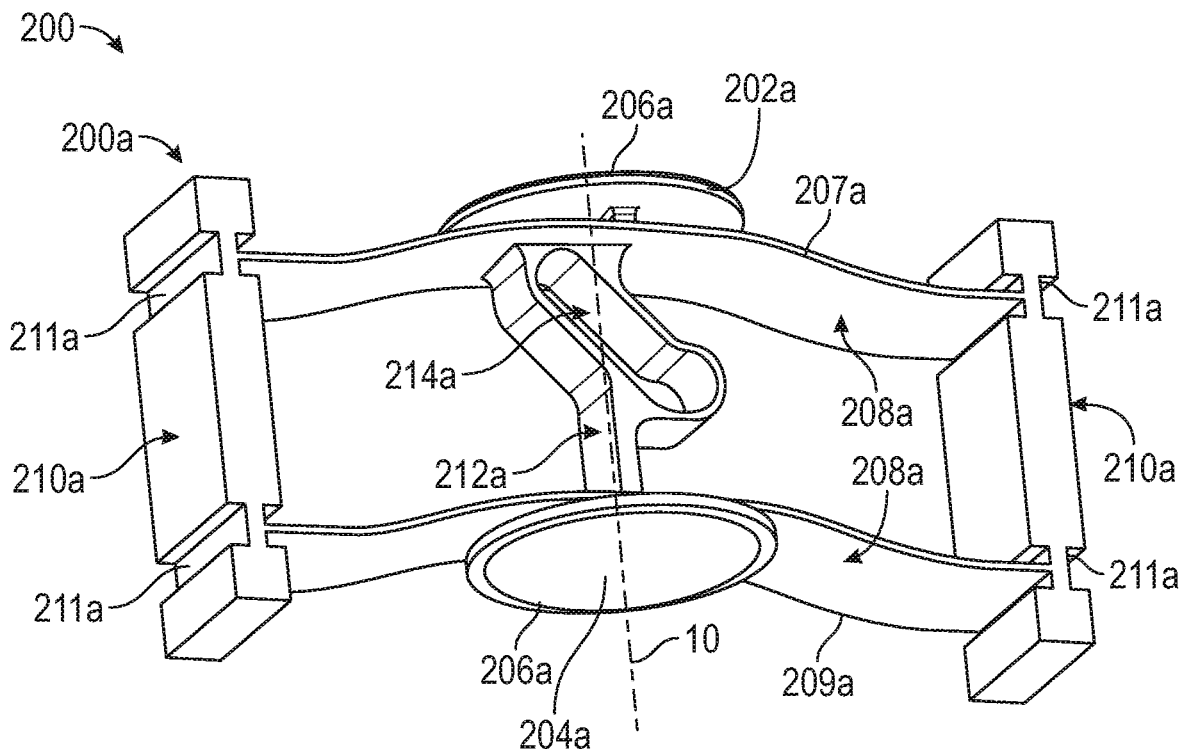
FIG. 3 is a perspective view of a first poppet assembly of the valve assembly of FIG. 1.

As shown in FIG. 3, in one non-limiting example, the first poppet assembly 200a can include a first poppet 202a and a second poppet 204a. The first poppet 202a and the second poppet 204a can be arranged on opposing ends of the first poppet assembly 200a. For example, the first poppet 202a can be arranged on an upper distal end of the first poppet assembly 200a (e.g., from the perspective of FIG. 3) and the second poppet 204a can be arranged on a lower distal end of the first poppet assembly 200a opposite the first poppet 202a. In some non-limiting examples, the first and second poppets 202a, 204a can define a substantially circular shape, however, other shapes could be used. For example, the poppets 202a, 204a can be substantially oval, square, or rectangular in shape. In some non-limiting examples, the first and second poppets 202a, 204a can be planar (e.g., flat). In other non-limiting examples, the first and second poppets 202a, 204a can define a concave or a convex shape.

A poppet seal 206a can be provided on the first and second poppets 202a, 204a that extends along the periphery of the first and second poppets 202a, 204a. In some non-limiting examples, the poppet seal 206a can be integral to the first and second poppets 202a, 204a or, alternatively, the poppet seal 206a can be integrally formed with the valve housing 102. In other non-limiting examples, the poppet seal 206a can be a separate part that can be snapped in place or otherwise installed on to the first and second poppets 202a, 204a during valve assembly. In the illustrated non-limiting example, the first poppet assembly 200a and first and second poppets 202a, 204a can be integrally formed as a unitary component.

The first poppet assembly 200a can include one or more springs. In the illustrated non-limiting example, the springs are in the form of compliant beams 208a. In the illustrated non-limiting example, the first poppet assembly 200a includes a first compliant beam 207a and a second compliant beam 209a. The first compliant beam 207a and the second compliant beam 209a can be arranged parallel to and spaced apart from one another, with the first compliant beam 207a adjacent to the first poppet assembly 200a and the second compliant beam 209a adjacent to the second poppet 204a.

The first poppet assembly 200a can also include one or more side support structures 210a, a center support structure 212a, and a first sliding yoke 214a. The center support structure 212a can span between the first and second poppets 202a, 204a. The first sliding yoke 214a can be arranged between the first compliant beam 207a and the second compliant beam 209a. In the illustrated non-limiting example, the side support structures 210a can be arranged parallel to and spaced apart from one another. The side support structures 210a can extend in a direction that is generally perpendicular to the first compliant beam 207a and the second compliant beam 209a, with one of the side support structures 210a arranged on a left side (e.g., from the perspective of FIG. 3) of the first poppet assembly 200a and another of the side support structures 210a arranged on a right side (e.g., from the perspective of FIG. 3) of the first poppet assembly 200a. Each side support structure 210a can be configured to engage one of the valve guides 114 within the valve housing 102 (see FIG. 2). The engagement between the side support structure 210a and the valve guides 114 can rotationally lock the first poppet assembly 200a relative to the valve housing 102. The engagement between the side support structure 210a and the valve guides 114 can also aid in alignment of the first poppet assembly 200a with the ports 106 of the valve housing 102 during assembly. In the illustrated non-limiting example, the side support structure 210a can include a plurality of valve guide recesses 211a that extend laterally along an outer surface of the side support structures 210a. Each of the valve guide recesses 211a can receive a corresponding valve guide 114 therein to secure the first poppet assembly 200a within the valve housing 102.

The first and second compliant beams 207a, 209a can extend laterally between, or span, the side support structures 210a. In general, the compliant beams 208a can be configured to provide multi-stable functionality of the first poppet assembly 200a. For example, when a force is applied axially to the first poppet assembly 200a (e.g., along an axis 10 defined by the center support structure 212a), the compliant beams 208a can experience increased bending moments and compression forces. After reaching a predetermined displacement point or position, the increased bending moments and compression forces can cause the compliant beams 208a to snap over, resulting in the first and second poppets 202a, 204a to displace axially (e.g., along axis 10) from one end position to an opposite end position. In this way, for example, power may only be required to be applied to actuate or rotate the crankshaft assembly 300 to deflect the first poppet assembly 200a from one end position to the predetermined position, after which the compliant beams 208a can provide the motion and force required to move and hold the first poppet assembly 200a in the opposite end position.

In the illustrated non-limiting example, the first sliding yoke 214a can be arranged between the first compliant beam 207a and the second compliant beam 209a. In the illustrated non-limiting example, the first sliding yoke 214a can be integrally formed into the center support structure 212a. The first sliding yoke 214a can be coupled to a portion of the crankshaft assembly 300, such that the crankshaft assembly 300 can provide an input displacement to the first poppet assembly 200a. For example, the portion of the crankshaft assembly 300 coupled to the first sliding yoke 214a can be configured to provide an axial displacement (e.g., vertically along the axis 10). In other non-limiting examples, a crankshaft assembly can be configured to provide a linear displacement (e.g., left to right or into and out of the page from the perspective of FIG. 3), a helical displacement, and/or a rotational displacement to a sliding yoke in order to facilitate movement of the poppets between two end positions.

Figure 4:
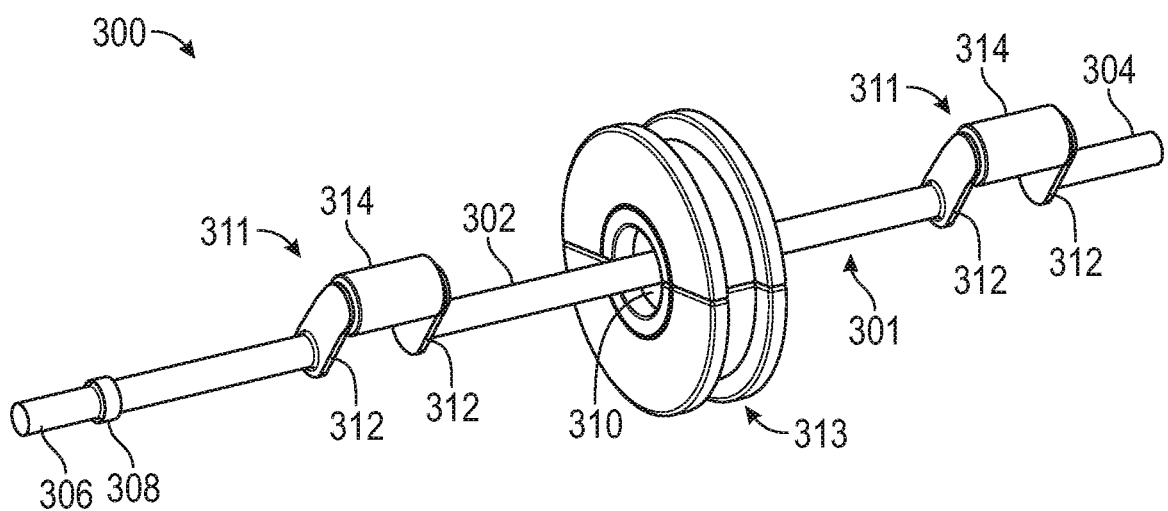
FIG. 4 is a perspective view of a crankshaft assembly of the valve assembly of FIG. 1.

With reference to FIG. 4, the crankshaft assembly 300 can include a crankshaft 301. The crankshaft 301 can define a central shaft 302, a first end 304, and a second end 306. In some non-limiting examples, an actuator (not shown) can be coupled to the crankshaft 301 to provide power to rotate the crankshaft 301. For example, the first end 304 of the crankshaft 301 can be coupled to an actuator (e.g., a rotary actuator, a drive motor, etc.) configured to rotate the crankshaft 301 in a desired direction. In some non-limiting examples, the first end 304 of the crankshaft 301 can protrude outside of the valve housing 102 (see FIG. 1) to allow the engagement with the actuator (not shown). In some non-limiting examples, the first end 304 of the crankshaft 301 may be the only portion of the crankshaft assembly 300 that protrudes from, or is arranged external to, the valve housing 102. In some non-limiting examples, only a single external dynamic seal (not shown) may be required to prevent leakage outside of the valve housing 102. For example, a dynamic seal can be arranged between the first end 304 of the crankshaft 301 and the valve housing 102 to prevent external leakage.

In the illustrated non-limiting example, the crankshaft assembly 300 can also include a thrust bearing 308 and a center bearing 310. The second end 306 of the crankshaft 301 can be at least partially received within and rotatably coupled to the crankshaft end support 112 (see FIG. 2). The thrust bearing 308 can be arranged on the central shaft 302 adjacent to the second end 306 and can extend radially outward from the central shaft 302. The thrust bearing 308 can provide support for axial loads (i.e. loads applied on or parallel to an axis defined by the central shaft 302) on the crankshaft 301 via surface contact between the thrust bearing 308 and the crankshaft end support 112. The center bearing 310 can be received within the bearing support aperture 105 during valve assembly and can be rotatably coupled to the central shaft 302. The center bearing 310, along with the dividing wall 104, can provide support for radial loads (i.e. loads applied normal to an axis defined by the central shaft 302) on the crankshaft 301. In some aspects, the center bearing 310 can be comprised of a split bushing 313 with a seal (not shown) to prevent internal fluid leakage between first valve section 108 and the second valve section 109.

The crankshaft 301 can include one or more throws 311 configured to engage the sliding yokes 214a, 214b of the one or more poppet assemblies 200 to facilitate moving the one or more poppet assemblies 200 between end positions. For example, the crankshaft 301 can include a throw 311 for each of the one or more poppet assemblies 200. In the illustrated non-limiting example, the crankshaft 301 includes two throws 311 axially separated from one another, one for engagement with the first poppet assembly 200a and one for engagement with the second poppet assembly 200b. The throws 311 can each include a pair of throw arms 312 and a pin 314. The throw arms 312 can extend radially outward from the central shaft 302 and can be rigidly coupled thereto. The pin 314 can be coupled to, and extend between, the pair of throw arms 312, such that the pin 314 and the throw arms 312 rotate with the crankshaft 301. In some non-limiting examples, the pins 314 can be rotatably coupled to the throw arms 312.

Figure 5A:
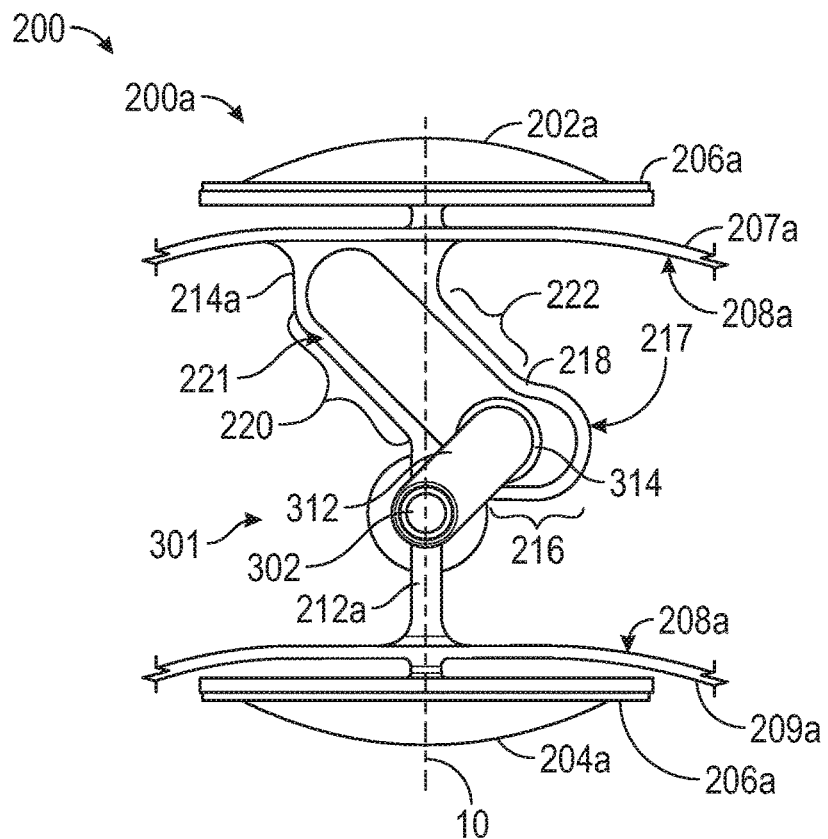
FIG. 5A is a side view of the first poppet assembly of FIG. 3.

The pins 314 can be slidably coupled to the first sliding yoke 214a and the second sliding yoke 214b (see, e.g., FIG. 5A). When assembled, the first sliding yoke 214a can be arranged between the throw arms 312 of one of the throws 311 and the second sliding yoke 214b can be arranged between the throw arms 312 of another one of the throws 311. In this way, for example, the pin 314 of one of the throws 311 can extend through and engage the first sliding yoke 214a and the pin 314 of another of the throws 311 can extend through and engage the second sliding yoke 214b.

In illustrated non-limiting example, the throws 311 are circumferentially aligned along the central shaft 302. However, other arrangements of the throws 311 are possible. For example, the throws 311 can be circumferentially offset from one another. In this way, for example, mechanical timing of the opening or closing of either of the first poppet assembly 200a or the second poppet assembly 200b can be adjusted to meet the requirements of various applications. These adjustments can advance or retard the opening or closing of either of the first poppet assembly 200a or the second poppet assembly 200b in relation to one another.

Figure 5B:
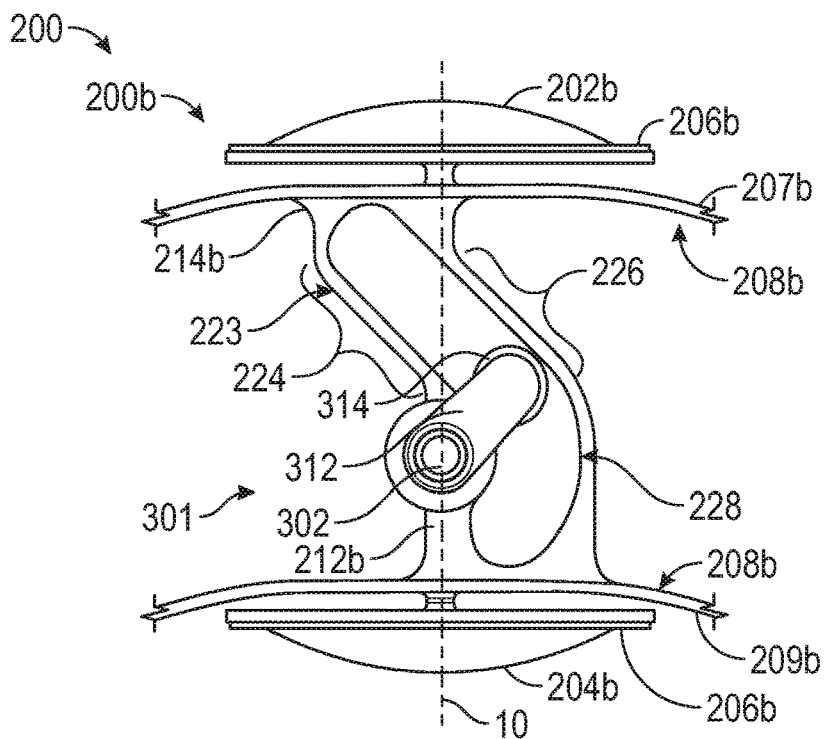
FIG. 5B is a side view of a second poppet assembly of the valve assembly of FIG. 1.

As illustrated in FIGS. 5A-5B, the first sliding yoke 214a and the second sliding yoke 214b can define various geometries dependent on a desired actuation characteristic of the first and second poppet assemblies 200a, 200b. In general, the crankshaft 301 can define a displacement path along which the pin 314, or another portion of the crankshaft 301 that interfaces with the first sliding yoke 214a and the second sliding yoke 214b, travels along as it is moved by an actuator (not shown). For example, the pin 314 of the crankshaft 301 can define a round, a curved, an arcuate, or a circular displacement path as the crankshaft 301 is rotated. In some non-limiting examples, the portion of the crankshaft 301 (e.g., the pin 314) that interfaces with a yoke on a poppet assembly may be configured to displace along a linear, an angled, or any desired displacement path as the crankshaft 301 is displaced relating to the first and second poppet assemblies 200a, 200b. In some non-limiting examples, at least a portion of the first sliding yoke 214a and/or the second sliding yoke 214b can define a shape or geometry that conforms to at least a portion of the displacement path. For example, the first sliding yoke 214a and/or the second sliding yoke 214b may include an analogous portion that defines a shape that conforms to or is the same as at least a portion of the displacement path defined by the portion of the crankshaft 301 that interfaces with the first sliding yoke 214a and/or the second sliding yoke 214b as the crankshaft 301 is displaced or rotated. In this way, for example, the first poppet assembly 200a and/or the second poppet assembly 200b may remain in its position as the crankshaft 301 travels along the analogous portion. That is, due to the similar shapes of the analogous portion and at least a portion of the displacement path, the crankshaft 301 will travel along the analogous portion without engaging the first sliding yoke 214a and/or the second sliding yoke 214b, which maintains the first poppet assembly 200a and/or the second poppet assembly 200b in its position.

Alternatively, the first sliding yoke 214a and/or the second sliding yoke 214b may include an engagement portion that is configured to engage with the crankshaft 301 and displace the first poppet assembly 200a and/or the second poppet assembly 200b. In general, the engagement portion may define a shape that intersects with at least a portion of the displacement path of the portion of the crankshaft 301 that interfaces with the first poppet assembly 200a and/or the second poppet assembly 200b. For example, if the displacement path defines a round, a circular, or an arcuate shape, the engagement portion may define a linear, an angled, or a straight shape to ensure that the portion of the crankshaft 301 within the first sliding yoke 214a and/or the second sliding yoke 214b engages the first sliding yoke 214a and/or the second sliding yoke 214b In the illustrated non-limiting example, the engagement portion of the first sliding yoke 214a can include a flat portion 217 and an angled portion 221. In general, the flat portion 217 and the angled portion 221 combine to define a continuous slot within which the pin 314 can be received. In the illustrated non-limiting example, the angled portion 221 can be arranged adjacent to the first compliant beam 207a and can extend in a general direction toward the second compliant beam 209. In the illustrated non-limiting example, the flat portion 217 can include a first flat wall 216 and a second flat wall 218 that is substantially parallel to the first flat wall 216 and spaced apart therefrom, such that the pin 314 can be received between the first flat wall 216 and the second flat wall 218. The angled portion 221 can include a first angled wall 220 and a second angled wall 222 that is substantially parallel to the first angled wall 220 and spaced apart therefrom, such that the pin 314 can be received between the first angled wall 220 and the second angled wall 222. Both of the first angled wall 220 and the second angled wall 222 can be angled with respect to an axis defined by the center support structure 212a (e.g., arranged at an angle between zero and one-hundred and eighty degrees with respect to the axis 10).

As previously noted herein, the crankshaft 301 can selectively actuate the first and second poppet assemblies 200a, 200b between a first end position and a second end position. For example, the first poppet assembly 200a can be selectively actuated between a first end position and a second end position. Similarly, the second poppet assembly 200b can be selectively actuated between a first end position and a second end position (i.e., a third end position and a fourth end position). In the illustrated non-limiting example of FIG. 5A, rotation of the crankshaft 301 in a first direction (e.g., a clockwise direction) can bring the pin 314 into engagement with the first flat wall 216 of the first sliding yoke 214a, thereby applying a force to the first poppet assembly 200a to move from a first end position towards a second end position (e.g., a downward direction relative to the central shaft 302 from the perspective of FIG. 5A). To return to the illustrated position of FIG. 5A, rotation of the crankshaft 301 in a second direction (e.g., a counterclockwise direction) can bring the pin 314 into engagement with the second flat wall 218, thereby applying a force to the first poppet assembly 200a to move from the second end position towards the first end position (e.g., an upward direction relative to the central shaft 302 from the perspective of FIG. 5A).

Alternatively, starting from the illustrated position of FIG. 5A, rotation of the crankshaft 301 in the second direction (e.g., a counterclockwise direction) can bring the pin 314 into engagement with the first angled wall 220, thereby applying a force to the first poppet assembly 200a to move from the first end position towards the second end position (e.g., the downward direction relative to the central shaft 302 from the perspective of FIG. 5A). To return to the illustrated position of FIG. 5A, rotation of the crankshaft assembly 300 in the first direction (e.g., clockwise direction) can bring the pin 314 into engagement with the second angled wall 222, thereby applying a force the first poppet assembly 200a to move from the second end position towards the first end position (e.g., the upward direction relative to the central shaft 302 from the perspective of FIG. 5A).

In general, the design, shape, and/or geometry of the sliding yoke on a poppet assembly can be tailored to provide desired movement characteristics in response to an input from the crankshaft 301. As illustrated in FIG. 5B, the second poppet assembly 200b can include similar features as the first poppet assembly 200a, with similar components identified using like reference numerals with a "b" suffix, except as described herein or apparent from the figures. Other aspects between the first and second poppet assemblies 200a, 200b that are the same or substantially similar in structure and/or function will not be repeated. As such, it is to be understood that, unless stated or shown otherwise, elements reference with like numerals can function the same or substantially similar to those of the first poppet assembly 200a.

In some non-limiting examples, the second sliding yoke 214b of the second poppet assembly 200b can be configured differently than the first sliding yoke 214a of the first poppet assembly 200a to provide varying displacement/movement characteristics of the second poppet assembly 200b when compared to the first poppet assembly 200a. The movement characteristics of the first poppet assembly 200a and the second poppet assembly 200b can be controllable by rotation of the crankshaft 301 in combination with the specific geometries of the first sliding yoke 214a and the second sliding yoke 214b.

FIG. 5B illustrates a non-limiting example of the second poppet assembly 200b. Similar to the first poppet assembly 200a, the second poppet assembly 200b can also include a first poppet 202b, a second poppet 204b (i.e., a third poppet and a fourth poppet), a poppet seal 206b arranged on a periphery of the first poppet 202b and the second poppet 204b, and one or more compliant beams 208b. The one or more compliant beams 208b can include a first compliant beam 207b and a second compliant beam 209b arranged adjacent to the first poppet 202b and the second poppet 204b, respectively. For example, the second sliding yoke 214b can be arranged between the first compliant beam 207b and the second compliant beam 209b. As previously described herein, the first compliant beam 207b and the second compliant beam 209b can be configured to snap the second poppet assembly 200b between opposing end positions once the second poppet assembly 200b is displaced to a predetermined position.

In the illustrated non-limiting example, the second sliding yoke 214b can define a geometry that can include an engagement portion (e.g., angled portion 223) and a curved portion or an analogous portion 228. In general, the angled portion 223 and the curved portion 228 can define a continuous slot within which the pin 314 can be received. In the illustrated non-limiting example, the angled portion 223 can be arranged adjacent to the first compliant beam 207b and can extend in a general direction toward the second compliant beam 209b to a junction between the angled portion 223 and the curved portion 228. The curved portion 228 can extend from the junction between the angled portion 223 and the curved portion 228 toward the second compliant beam 209b.

In the illustrated non-limiting example, the angled portion 223 can include a first angled wall 224 and a second angled wall 226 that is substantially parallel to the first angled wall 224 and spaced apart therefrom, such that the pin 314 can be received between the first angled wall 224 and the second angled wall 226. Both of the first angled wall 224 and the second angled wall 226 can be angled with respect to a vertical center axis defined by the second poppet assembly 200b (e.g., axis 10). In general, the curved portion 228 may define a similar shape to at least a portion of the displacement path of the pin 314. For example, the curved portion 228 can define a geometry that is concentric to a center of rotation defined by the crankshaft assembly 300. The curved portion 228 can define an arcuate shape that is the same shape as the displacement path of the pin 314, such that during rotation of the crankshaft 301, the pin 314 may not engage walls of the curved portion 228. For example, rotation of the crankshaft assembly 300 can cause the pin 314 to follow the curved portion 228 without engaging the walls of the second sliding yoke 214b, which can result in a lost motion where rotation of the crankshaft assembly 300 does not produce any axial movement of the second poppet assembly 200b. In other words, the second poppet assembly 200b can be maintained in an end position as the pin 314 travels along the curved portion 228 during rotation of the crankshaft 301.

In the illustrated non-limiting example of FIG. 5B, rotation of the crankshaft 301 in a first direction (e.g., a clockwise direction) can result in the pin 314 traveling along the curved portion 228, thereby maintaining the second poppet assembly 200b in a first end position. A subsequent rotation of the crankshaft 301 in a second direction (e.g., a counterclockwise direction) can result in the pin 314 again traveling along the curved portion 228 back to the illustrated position of FIG. 5B. The movement of the pin 314 traveling back along the curved portion allows the second poppet assembly 200b to remain in the first end position.

Alternatively, starting from the illustrated position of FIG. 5B, rotation of the crankshaft 301 in the second direction (e.g., the counterclockwise direction) can bring the pin 314 into engagement with the first angled wall 224, thereby applying a force to the second poppet assembly 200b to move from the first end position towards a second end position (e.g., the downward direction relative to the central shaft 302 from the perspective of FIG. 5B). To return to the illustrated position of FIG. 5B, rotation of the crankshaft 301 in the first direction (e.g., the clockwise direction) can bring the pin 314 into engagement with the second angled wall 226, thereby applying a force to the second poppet assembly 200b to move from the second end position towards the first end position (e.g., the upward direction relative to the central shaft 302 from the perspective of FIG. 5B).

The arrangement, shape, and overall design of the first sliding yoke 214a and the second sliding yoke 214b can be designed in various ways and are not limited to the non-limiting examples illustrated in FIGS. 5A and 5B. The design of the first sliding yoke 214a and/or the second sliding yoke 214b can be manipulated to alter a timing of the opening or closing of the first poppet assembly 200a and/or the second poppet assembly 200b to meet the requirements of various applications. For example, the first sliding yoke 214a and/or the second sliding yoke 214b can be designed to advance or retard the opening or closing of the first poppet assembly 200a and/or the second poppet assembly in relation to one another. Alternatively or additionally, the design of the first sliding yoke 214a and/or the second sliding yoke 214b can minimize the total torque on by the crankshaft assembly 300. For example, the ability of the compliant beams 207a, 209a, 207b, 209b of the first poppet assembly 200a and the second poppet assembly 200b to bias the first poppet assembly 200a and the second poppet assembly 200b can be utilized to offset the overall torque output required by an actuator on the crankshaft 301.

In some non-limiting examples, valve drive mechanisms other than the crankshaft assembly 300, the first sliding yoke 214a, and the second sliding yoke 214b can be implemented. For example, the one or more poppet assemblies 200 can be driven via an integrated drive mechanism, such as utilizing a shape memory alloy (i.e. nitinol) that is electrically actuated. In other non-limiting examples, the valve drive mechanism can be a direct drive mechanism including, for example, a solenoid directly coupled to the poppet assembly 200, allowing for independent control of each poppet assembly 200. Other forms of a direct drive mechanism can include a toggle switch coupled to the poppet assembly 200, or alternatively, a linear mechanism such as a mechanical switch or a cam lobe with a corresponding follower integrated into the poppet assembly 200. In other non-limiting examples, the valve drive mechanism can be an indirect drive mechanism, for example, including a motor with a corresponding gear train. Other forms of an indirect drive mechanism can include a cam with a corresponding peg integrated into the poppet assembly 200, or a pulley system.

One non-limiting example of operation of the valve assembly 100 will be described with reference to FIGS. 6A-8C. In general, the integration of compliant beams into the poppet assemblies 200 can enable the poppet assemblies 200 to define multi-stable functionality, including mono-stable, bi-stable, or tri-stable functionality. Mono-stable functionality can be defined as a poppet assembly, or another valve mechanism being displaced to alter flow characteristics in a valve (e.g., a spool), being configured to remain in one stable end position without input power supplied thereto. Power can be required to move the poppet assembly from the stable end position and hold the poppet assembly with force in a non-stable end position. Bi-stable functionality can be defined as a poppet assembly, or another valve mechanism being displaced to alter flow characteristics in a valve (e.g., a spool), being configured to remain in two stable end positions without input power supplied thereto. Power can be required to move between the two stable end positions, but may not be required to hold the poppet assembly in the two stable end positions. Tri-stable functionality can be defined as a poppet assembly, or another valve mechanism being displaced to alter flow characteristics in a valve (e.g., a spool), being configured to remain in two stable end positions and an intermediate position between the two end positions without input power supplied thereto. Power can be required to move the poppet assembly between the two stable end positions and the intermediate position, but may not be required to hold the poppet assembly in the two stable end positions and the intermediate position. In addition to the multi-stable functionality that can be defined by the valve assembly 100, the use of compliant beams can be integrated into a proportional valve assembly.

In the illustrated non-limiting example, the first poppet assembly 200a and the second poppet assembly 200b can define a bi-stable functionality, which enables the valve assembly 100 to be operable in a plurality of configurations to provide varying flow paths. For example, each of the first poppet assembly 200a and the second poppet assembly 200b can be selectively moveable between a first end position (see FIG. 6B) and a second end position (see FIG. 7B). In some non-limiting examples, each of the first poppet assembly 200a and the second poppet assembly 200b can be individually and selectively moveable between a first end position (see FIG. 6B) and a second end position (see FIGS. 7B-8B) depending on a direction of rotation of the crankshaft 301 and the geometry defined by the first and second sliding yokes 214a, 214b. In each of the first end position and the second end position, the compliant beams 208 can be configured to provide sufficient holding force to meet a required poppet seal force (i.e., one of the first poppet 202a, 202b or the second poppet 204a, 204b can seal against the valve housing 102 to inhibit fluid flow to or from one of the first port 116, the second port 118, or the third port 120). In addition, the compliant beams 208 can enable the first poppet assembly 200a and the second poppet assembly 200b to remain in the first end position and the second end position without input power supplied, for example, to the crankshaft 301.

Figure 8C:
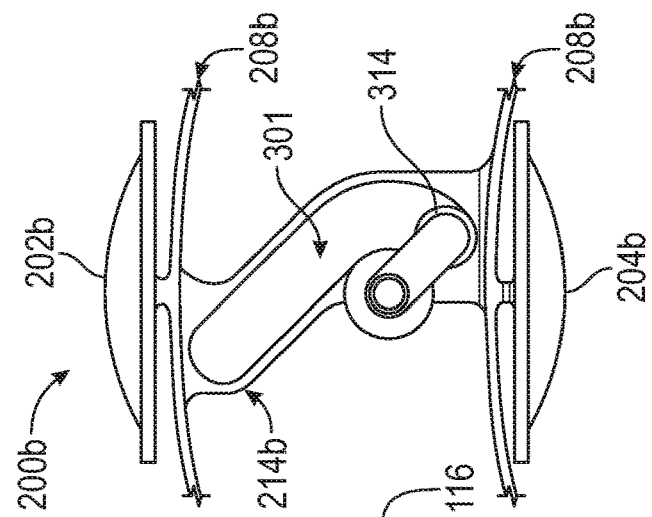
FIG. 8C is a side view of the second poppet assembly of FIG. 1 with the valve assembly in a third configuration.
Figure 8B:
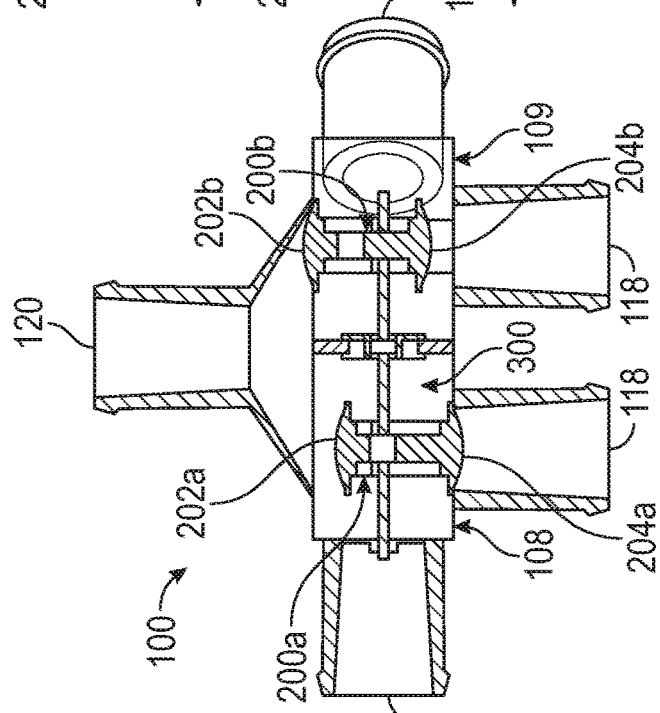
FIG. 8B is a cross-sectional view of the valve assembly of FIG. 1 taken along line 6-6 with the valve assembly in a third configuration.
Figure 8A:
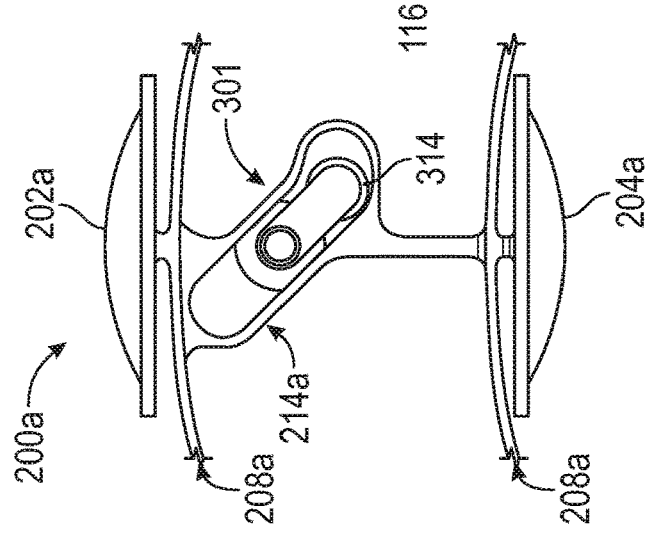
FIG. 8A is a side view of the first poppet assembly of FIG. 1 with the valve assembly in a third configuration.

In the non-limiting example illustrated in FIGS. 6A-8C, the valve assembly 100 can be selectively actuated between a first configuration (FIGS. 6A-6C), a second configuration (FIGS. 7A-7C), and a third configuration (FIGS. 8A-8C). FIGS. 6A to 6C illustrate the valve assembly 100 in a first configuration, where the first poppet assembly 200a and the second poppet assembly 200b are in a first end position and the crankshaft 301 is in a neutral position. With the first poppet assembly 200a in the first end position, the first poppet 202a can be sealed against the inside of valve housing 102, thereby blocking flow to the third port 120 of the first valve section 108, and the second poppet 204a can be lifted off of the inside of the valve housing 102, thereby allowing flow to the second port 118 of the first valve section 108. In this way, for example, the first poppet assembly 200a can inhibit fluid communication between the first port 116 and the third port 120 of the first valve section 108, and provide fluid communication between the first port 116 and the second port 118 of the first valve section 108. Similarly, with the second poppet assembly 200b in the first end position, the first poppet 202a can be sealed against the inside of the valve housing 102, thereby blocking flow to the third port 120 of the second valve section 109, and the second poppet 204a can be lifted off of the inside of the valve housing 102, thereby allowing flow to the second port 118 of the second valve section 109. In this way, for example, the second poppet assembly 200b can inhibit fluid communication between the first port 116 and the third port 120 of the second valve section 109, and provide fluid communication between the first port 116 and the second port 118 of the second valve section 109.

FIGS. 7A to 7C illustrate the valve assembly 100 in a second configuration, where the first poppet assembly 200a and the second poppet assembly 200b are in the second end position. Actuation of the crankshaft 301 in a desired direction at a predetermined magnitude can actuate the valve assembly 100 between the first configuration and the second configuration. In the illustrated non-limiting example, an approximately ninety degree rotation of the crankshaft 301 in the second direction (e.g., a counterclockwise direction) can actuate the first poppet assembly 200a and the second poppet assembly 200b from the first end position toward the second end position. During the rotation of the crankshaft 301, one of the pins 314 engages the angled portion 221 of the first sliding yoke 214a and one of the pins 314 engages the angled portion 223 of the second sliding yoke 214b. In this way, for example, the first poppet assembly 200a and the second poppet assembly 200b are biased toward the second end position and begin to displace.

The first poppet assembly 200a and the second poppet assembly 200b continue to displace toward the second end position via input from the crankshaft 301 until the first poppet assembly 200a and the second poppet assembly 200b reach a first predetermined position between the first end position and the second end position. At the first predetermined position, the compliant beams 208a provide a force on the first poppet assembly 200a and the compliant beams 208b provide a force on the second poppet assembly 200b in a direction toward the second end position. The compliant beams 208a can then force the first poppet assembly 200a and the compliant beams 208b can then force the second poppet assembly 200b to displace toward, or snap into, the second end position without additional input from the crankshaft 301. The biasing force provided by the compliant beams 208a, 208b can maintain the first poppet assembly 200a and the second poppet assembly 200b in the second end position without input power provided to the crankshaft 301.

With the first poppet assembly 200a in the second end position, the first poppet 202a can be lifted off of the inside of the valve housing 102, thereby allowing fluid flow to the third port 120 of the first valve section 108, and the second poppet 204a can be sealed against the inside of the valve housing 102, thereby blocking fluid flow to the second port 118 of the first valve section 108. In this way, for example, the first poppet assembly 200a can inhibit fluid communication between the first port 116 and the second port 118 of the first valve section 108, and provide fluid communication between the first port 116 and the third port 120 of the first valve section 108. Similarly, with the second poppet assembly 200b in the second end position, the first poppet 202b can be lifted off of the inside of the valve housing 102, thereby allowing fluid flow to the third port 120 of the second valve section 109, and the second poppet 204b can be sealed against the inside of the valve housing 102, thereby blocking fluid flow to the second port 118 of the second valve section 109. In this way, for example, the second poppet assembly 200b can provide fluid communication between the first port 116 and the third port 120 of the second valve section 109, and inhibit fluid communication between the first port 116 and the second port 118 of the second valve section 109.

FIGS. 8A to 8C illustrate the valve assembly 100 in a third configuration, where the first poppet assembly 200a is in the second end position and the second poppet assembly 200b is in the first end position. Actuation of the crankshaft 301 in a desired direction at a predetermined magnitude can actuate the valve assembly 100 between the first configuration and the third configuration. In the illustrated non-limiting example, an approximately ninety degree rotation of the crankshaft 301 in the first direction (e.g., a clockwise direction) can actuate the first poppet assembly 200a from the first end position towards the second end position and the second poppet assembly 200b can be maintained in the first end position. In some non-limiting examples, when the valve assembly 100 is in the second configuration, the crankshaft 301 can be rotated approximately one hundred and eighty degrees in the first direction to be actuated to the third configuration.

If the valve assembly 100 is in the first configuration, the rotation of the crankshaft assembly 300 in the first direction can result in one of the pins 314 engaging the flat portion 217 of the first sliding yoke 214a, and one of the pins 314 traveling along the curved portion 228 of the second sliding yoke 214b. In this way, for example, the first poppet assembly 200a can be biased toward the second end position and begin to displace, and the second poppet assembly 200b can maintain its position in the first end position. As described herein, once the first poppet assembly 200a is displaced to the first predetermined position, the compliant beams 208a can displace the first poppet assembly 200a to the second end position. Simultaneously, second poppet assembly 200b can be maintained in the first end position.

If the valve assembly 100 is in the second configuration, the rotation of the crankshaft assembly 300 in the first direction can result in one of the pins 314 engaging the angled portion 221 of the first sliding yoke 214a (e.g., the second angled wall 222) and one of the pins 314 engaging the angled portion of the second sliding yoke 214b (e.g., the second angled wall 226). In this way, for example, the first poppet assembly 200a and the second poppet assembly 200b can be biased toward the first end position and begin to displace. The first poppet assembly 200a and the second poppet assembly 200b continue to displace toward the first end position via input from the crankshaft 301 until the first poppet assembly 200a and the second poppet assembly 200b reach a second predetermined position between the second end position and the first end position. At the second predetermined position, the compliant beams 208a can provide a force on the first poppet assembly 200a and the compliant beams 208b can provide a force on the second poppet assembly 200b in a direction toward the first end position. The compliant beams 208a, 208b can then force the first poppet assembly 200a and the second poppet assembly 200b to displace toward, or snap into, the first end position without additional input from the crankshaft 301. At this condition, the valve assembly 100 can be in the first configuration and the continued rotation of the crankshaft assembly 300 can displace the first poppet assembly 200a back to the second end position, while the second poppet assembly 200b is maintained in the first end position due to the pin 314 of the crankshaft 301 traveling along the curved portion 228.

The design and properties of the poppet assemblies 200 and, specifically, the use of compliant beams 208a, 208b can enable the valve assembly 100 to operate using substantially less input power and motion when compared to conventional valve assemblies. For example, the compliant beams 208a, 208b provide the biasing force necessary to move the poppet assemblies 200 between the first end position and the second end position once the first predetermined position or the second predetermined position are passed. In addition, the compliant beams 208a, 208b can provide the force necessary to maintain the poppet assemblies 200 in the first end position and the second end position. All of these factors can significantly reduce the amount of input power required to the crankshaft assembly 300. Further, the design of the first sliding yoke 214a and the second sliding yoke 214b, in combination with the biasing capabilities of the compliant beams 208a, 208b, can enable the valve assembly to be operable in at least three different operating configurations with a reduced range of crankshaft rotation. In some non-limiting examples, only an approximately one-hundred and eighty degree rotational range of the crankshaft assembly 300 is needed to achieve the three different operating configurations.

While FIGS. 6A through 8C illustrated three non-limiting configurations for operation of the valve assembly 100, a plurality of configurations can be conceived by one skilled in the art. For example, the motion described in the exemplary configurations utilizes a poppet assembly that travels along axial-planar motion, where the poppet assembly moves between the two end positions axially and in the same plane. In some non-limiting examples, the poppet assembly motion, or the motion of another valve mechanism (e.g., a spool) can be non-planar, where the poppet assembly moves between one or more end positions in two different planes. Additionally or alternatively, the poppet assembly motion can include three dimensional movement, where the poppet assemblies move between one or more end positions in more than one plane and/or along alternate axes.

In some non-limiting examples, the compliant beams 208a, 208b can define a constant thickness/cross-sectional thickness. In some non-limiting examples, the compliant beams 208a, 208b can define a variable thickness/cross-sectional thickness. In general, the dimensions, shape, and/or number of compliant beams 208a, 208b can be selected to define a desired force-deflection curve. In some non-limiting examples, the dimensions, shape, and/or number of compliant beams 208a, 208b can be selected to provide a desired contact force, which can maintain a seal between the poppets 202a, 204a, 202b, 204b, the poppet seals 206a, 206b, and the inside of the valve housing 102 (e.g., a poppet valve seat within the valve housing). In yet further non-limiting examples, a poppet assembly can include additional compliant beams (e.g., more than two), similar to that of the poppet assemblies 200 without the poppets 202a, 204a, 202b, 204b, where the compliant beams can be configured to offset load or torque on the crankshaft assembly 300. In some non-limiting examples, the compliant beams 208a can be fabricated from spring steel, sheet metal, polymers, monolithic polymer, composite material with spring steel, or any shape memory alloy.

Figure 9:
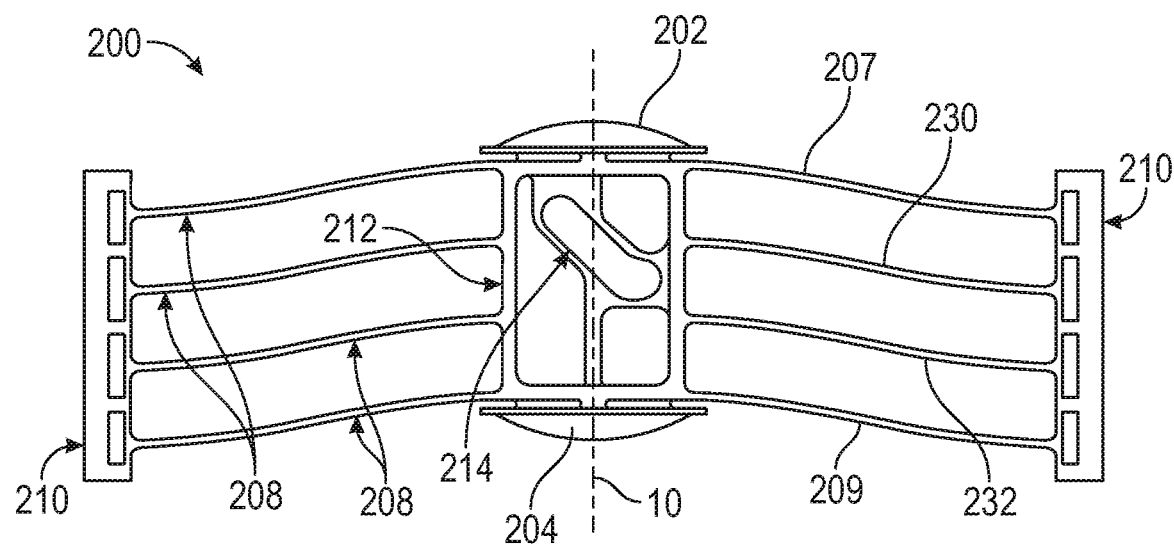
FIG. 9 is a side view of a poppet assembly according to one aspect of the present disclosure in a first terminal position.

As shown in FIG. 9, in some non-limiting examples a poppet assembly 200 can include a plurality of compliant beams 208. The general structural design of the poppet assembly 200 can be substantially similar to the poppet assemblies illustrated herein, for example, the poppet assemblies illustrated in FIGS. 5A and 5B, with similar components identified using like reference numerals, except as described herein or apparent from the figures. Aspects that are the same or substantially similar in structure and/or function will not be repeated. As such, it is to be understood that, unless stated or shown otherwise, elements reference with like numerals can function the same or substantially similar to those of the poppet assemblies illustrated in FIGS. 5A and 5B.

For example, the poppet assembly 200, similar to the poppet assembly illustrated in FIGS. 5A and 5B, can include a first poppet 202 and a second poppet 204. The first poppet 202 and the second poppet 204 can be arranged on opposing ends of the poppet assembly 200. For example, the first poppet 202 can be arranged on an upper distal end of the poppet assembly 200 (e.g., from the perspective of FIG. 9) and the second poppet 204 can be arranged on a lower distal end of the poppet assembly 200 opposite the first poppet 202. A poppet seal (not shown) can also be provided on the first and second poppets 202, 204.

In the illustrated non-limiting example, the poppet assembly 200 can include one or more compliant beams 208, one or more side support structures 210, a center support structure 212, and a sliding yoke 214. In the illustrated non-limiting example, the poppet assembly 200 can include a first compliant beam 207, a second compliant beam 209, a third compliant beam 230, and a fourth compliant beam 232. The first compliant beam 207, the second compliant beam 209, the third compliant beam 230, and the fourth compliant beam 232 can be arranged parallel to and spaced apart from one another, with the first compliant beam 207 adjacent to the first poppet 202, the second compliant beam 209 adjacent to the second poppet 204 with the third compliant beam 230 and the fourth compliant beam 232 arranged between the first compliant beam 207 and the second compliant beam 209.

In the illustrated non-limiting example, the poppet assembly 200 can include a center support structure 212. The central support structure can include a sliding yoke 214 that can be arranged between the first compliant beam 207 and the second compliant beam 209. It is to be appreciated that the arrangement, shape, and overall design of the sliding yoke 214 can define various geometries and is not limited to the non-limiting example illustrated in FIG. 9, for example, as previously discussed herein with respect to FIGS. 5A and 5B.

With continued reference to the illustrated non-limiting example of FIG. 9, the side support structures 210 can be arranged parallel to and spaced apart from one another on opposing sides of the poppet assembly 200. The side support structures 210 can extend in a direction that is generally perpendicular to the plurality of compliant beams 208, with one of the side support structures 210 arranged on a left side (e.g., from the perspective of FIG. 9) of the poppet assembly 200 and another of the side support structures 210 arranged on a right side (e.g., from the perspective of FIG. 10) of the poppet assembly 200. Each side support structure can be designed to be received within a valve housing (see, e.g., FIG. 2) to secure the poppet assembly 200 within the valve housing. The first, second, third, and fourth compliant beams 207, 209, 230, 232 can extend laterally between the side support structures 210 to receive the center support structure 212.

While the structural design of the poppet assembly 200 might differ that that of the poppet assemblies previously discussed herein (see, e.g., FIGS. 3, 5A, and 5B), the operation of the poppet assembly 200 can be substantially similar. For example, the plurality of compliant beams 208 can be configured to provide multi-stable functionality of the poppet assembly 200. For example, when a force is applied along a central axis defined by the center support structure 212 (e.g., axis 10) to the poppet assembly 200, the compliant beams 208 can produce forces that, after reaching a predetermined displacement position, cause the compliant beams 208 to snap over (e.g., displace axially) from one end position to an opposite end position. In this way, for example, power may only be required to actuate the crankshaft 301 (or any other mechanism for applying a force/displacement to the poppet assembly) to deflect the poppet assembly 200 from one end position to the predetermined position, after which the compliant beams 208 can provide the motion and force required to move and hold the poppet assembly 200 in the opposite end position.

In the illustrated non-limiting example, the sliding yoke 214 can be arranged within the center support structure 212 between the first poppet 202 and the second poppet 204. The sliding yoke 214 can be coupled to a portion of a crankshaft 301 (see, e.g., FIG. 11), which can provide an input displacement to the poppet assembly 200. A portion of the crankshaft 301 (e.g., a pin) slidably coupled to the sliding yoke 214 can be configured to provide an axial displacement to the sliding yoke 214 to facilitate movement of the poppet assembly 200 between two end positions. The relationship between displacement of the poppet assembly 200 and the spring force produced by the compliant beams 208 will be further understood in the paragraphs to follow.

Figure 10:
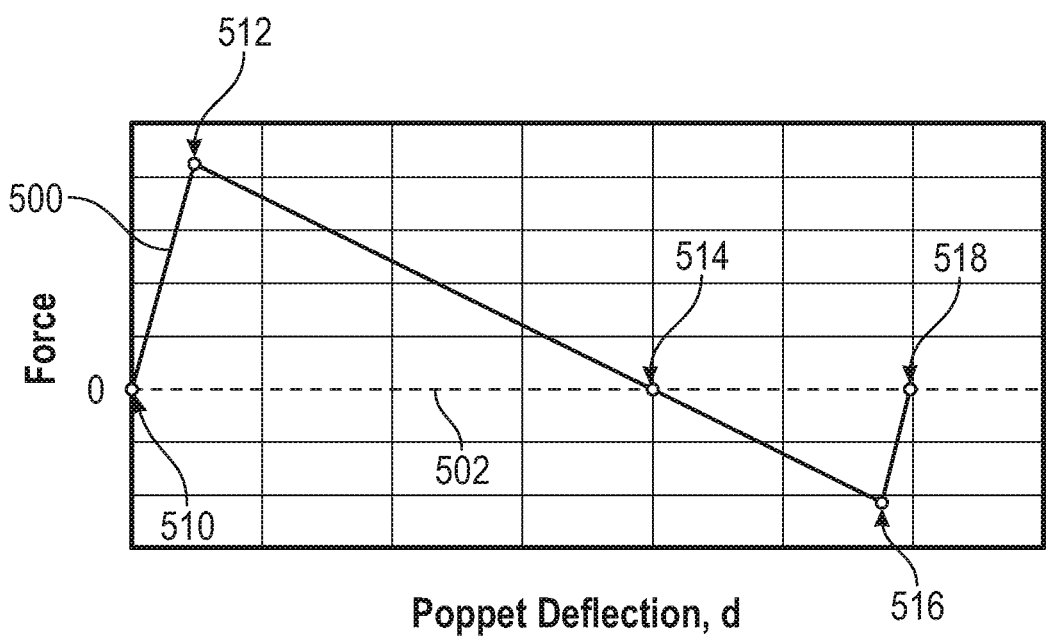
FIG. 10 is an exemplary graphical illustration of a compliant beam force-deflection spring curve of the poppet assembly of FIG. 9.

In the non-limiting exemplary graphical illustration of FIG. 10, the force-deflection spring curve 500 can include five positions of poppet assembly 200 displacement. It is to be understood that the following description of the force-deflection spring curve 500 may apply to, or be generic to, each of the poppet assemblies 200, 200a, 200b, described herein. It should be appreciated that the curve illustrated in FIG. 10 is discretized to illustrate the five positions, however, in application the curve can define a substantially sinusoidal shape. The force-deflection spring curve 500 can oscillate around an x-axis 502 (i.e., the horizontal axis). The points on the force-deflection spring curve that intersect the x-axis 502 can be representative of a spring force of zero (i.e., points at which the compliant beams 208 have a spring force of zero). The force-deflection spring curve 500 can represent a substantially sinusoidal shape, defining five positions that can be directly related to a displacement of the poppet assembly 200. These positions include a first terminal position 510, a first end position 512, a predetermined displacement position 514, a second end position 516, and a second terminal position 518.

Figure 11:
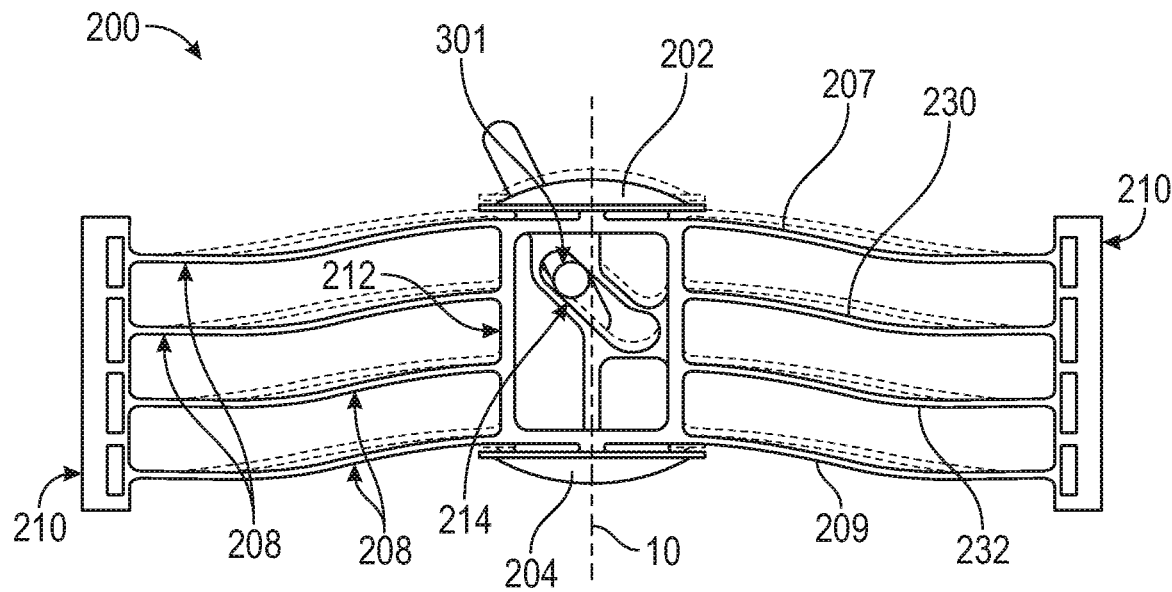
FIG. 11 is a side view of the poppet assembly of FIG. 9 with the poppet assembly in a first end position.

As shown in FIG. 10, in one non-limiting example, the poppet assembly 200 can be displaced from the first terminal position 510 (shown transparent in FIG. 11) to the first end position 512 (shown in solid in FIG. 11). During the displacement from the first terminal position 510 to the first end position 512, the spring force provided by the compliant beams 208 increases rapidly in a first direction (e.g., upward from the perspective of FIG. 11) from zero to a local maxima. The spring force produced by compliant beams 208 in the first end position 512 provide a particular contact force, which maintains a seal between the poppets 202, 204 and the inside of the valve housing (see, e.g., FIG. 2). The displacement of the poppet assembly 200 from the first terminal position 510 to the first end position 512 can be provided by a poppet seal (not shown) between the first poppet 202 and the inside of the valve housing or a pre-biasing of the compliant members, when the poppet assembly 200 is installed within the valve housing. That is, a crankshaft 301 may require zero power (i.e., imparts no force) on the poppet assembly 200 during the displacement between the first terminal position 510 and the first end position 512. Various other means of providing the displacement can be perceived by those skilled in the art, and are not limited to the prior example described. For example, a shim, washer, or any other mechanisms can provide the displacement of the poppet assembly 200 from the first terminal position 510 to the first end position 512 to pre-bias the compliant beams 208.

Figure 12:
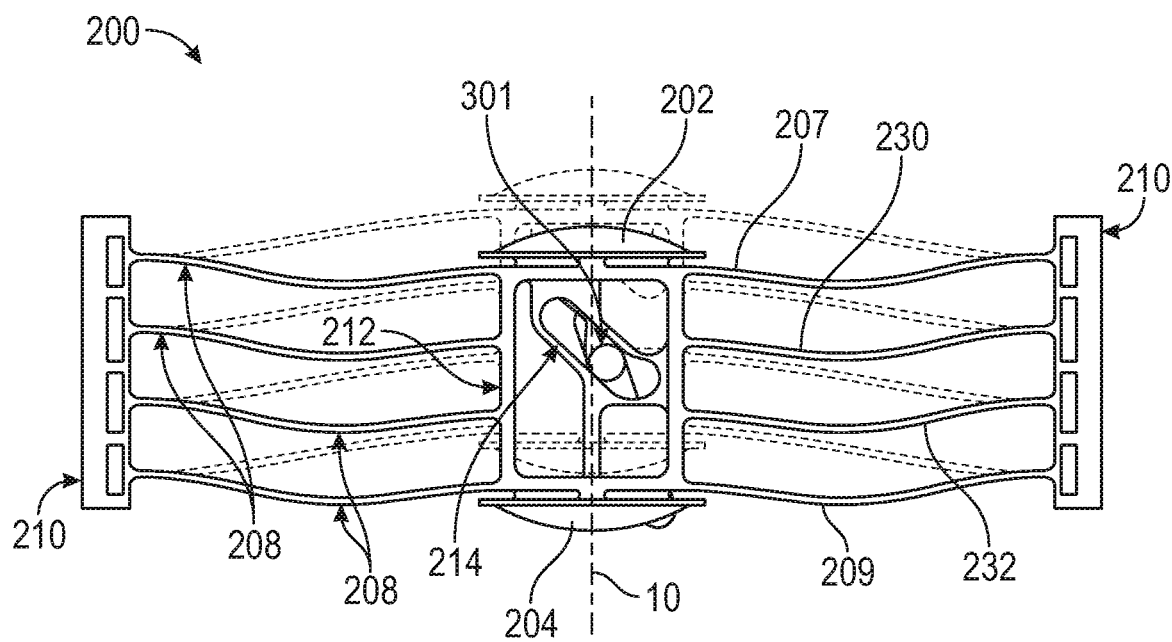
FIG. 12 is a side view of the poppet assembly of FIG. 9 with the poppet assembly in an intermediate position.
Figure 13:
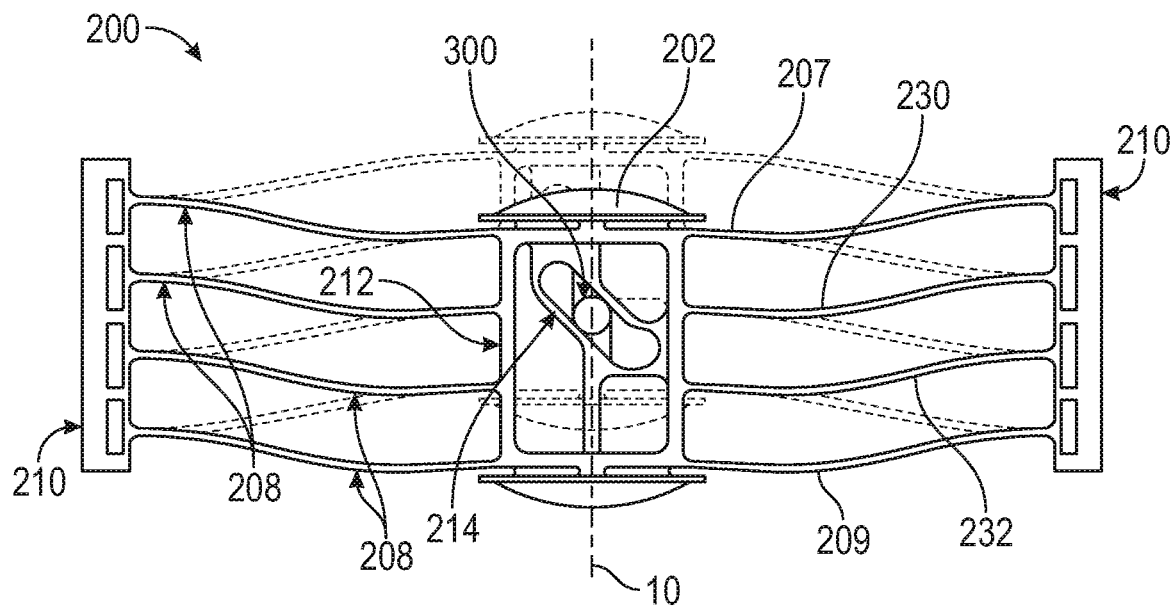
FIG. 13 is a side view of the poppet assembly of FIG. 9 with the poppet assembly in a second end position.

Referring still to FIG. 10, the poppet assembly 200 can be displaced from the first end position 512 to the second end position 516 (shown in solid in FIG. 13). Similar to the operation of the poppet assembly previously described herein, the crankshaft 301 can engage the sliding yoke 214 to cause an initial displacement. As the displacement increases (e.g., from left to right from the perspective of FIG. 10) the spring force produced by the compliant beams 208 decreases in a second direction (e.g., downward from the perspective of FIG. 10). As the poppet assembly 200 continues to displace towards the second end position 516, the poppet assembly 200 reaches a predetermined displacement position 514 (shown in solid in FIG. 12). At the predetermined displacement position 514, the force-deflection spring curve 500 crosses the x-axis 502. At this position the spring force produced by the compliant beams 208 is approximately zero. After the predetermined displacement position 514, the crankshaft 301 no longer provides the displacement and the compliant beams 208 take over and snap the poppet assembly 200 into the second end position 516. That is, once the poppet assembly 200 reaches the predetermined displacement position 514, the crankshaft 301 is no longer powered to provide the displacement and the displacement is caused by the compliant beams 208.

Figure 14:
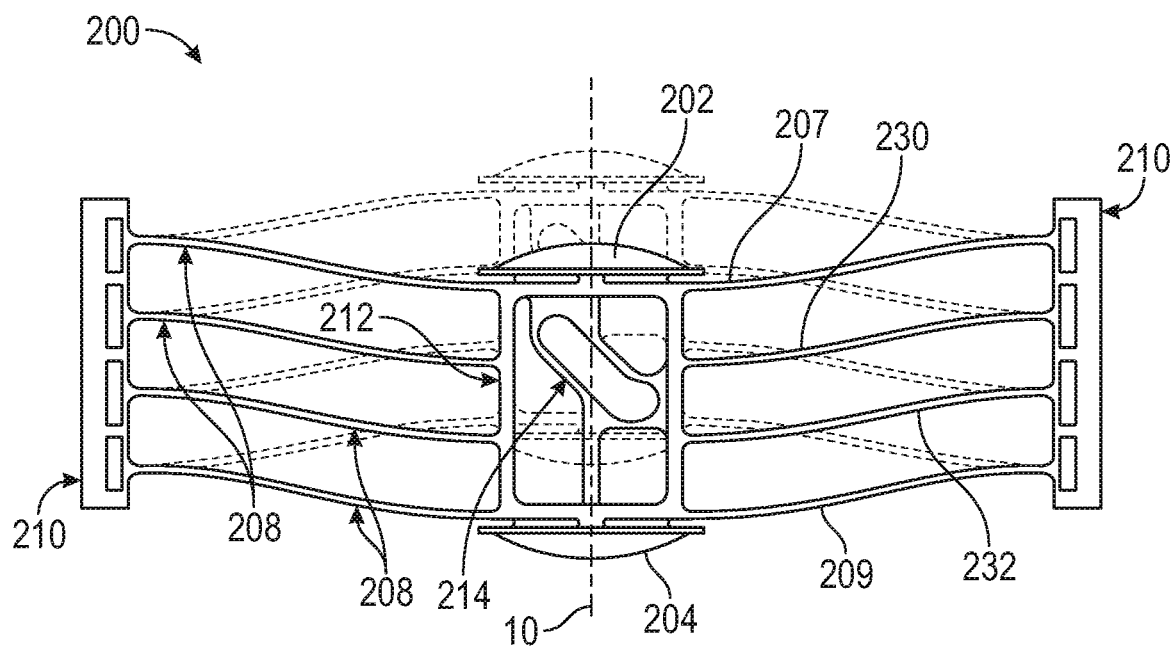
FIG. 14 is a side view of the poppet assembly of FIG. 9 with the poppet assembly in a second terminal position.

The poppet assembly 200 can also be displaced from the second end position 516 to the second terminal position 518 (shown in solid in FIG. 14). During the displacement from the second end position 516 to the second terminal position 518, the spring force provided by the compliant beams 208 increases rapidly in a first direction (e.g., upward from the perspective of FIG. 10). Similar to the displacement between the first terminal position 510 and the first end position 512, the spring force produced by compliant beams 208 in the second end position 516 provide a particular contact force. The displacement of the poppet assembly 200 can be provided by the poppet seal (not shown) between the second poppet 204 and the inside of the valve housing or by a pre-biasing of the compliant beams 208, when the poppet assembly 200 is installed within the valve housing. That is, a crankshaft 301 may require zero power (i.e., imparts no force) on the poppet assembly 200 during the displacement between the second terminal position 518 and the second end position 516. Various other means of providing said displacement can be perceived by those skilled in the art, and are not limited to the previous example described. For example, a shim, washer, or any other mechanisms can provide the displacement of the poppet assembly 200 from the second terminal position 518 to the second end position 516 to pre-bias the compliant beams 208.

The displacement of the poppet assembly 200, as shown by FIG. 10, has been described as displacing from a first end position 512 to a second end position 516. However, it is to be appreciated that the poppet assembly 200 can also displace from the second end position 516 to the first end position 512. The crankshaft 301 can engage the sliding yoke 214 to cause an initial displacement. As the poppet assembly 200 continues to displace towards the first end position 512, the poppet assembly 200 reaches a predetermined displacement position 514 (shown in solid in FIG. 12). After the predetermined displacement position 514, the crankshaft 301 may no longer provide the displacement and the compliant beams 208 can take over and snap the poppet assembly 200 into the first end position 512. That is, once the poppet assembly 200 reaches the predetermined displacement position 514, the crankshaft 301 may no longer be powered to provide the displacement and said displacement is caused by the compliant beams 208.

It is to be appreciated that, while not explicitly shown in FIG. 10, near a local maxima of a substantially sinusoidal curve (such as at the first end position 512 on the force-deflection spring curve 500) the spring force can remain substantially constant over a range of displacement. That is, displacement around the first end position 512 (e.g., left or right from the perspective of FIG. 10) can yield little to no change in the spring force provided by the compliant beams 208. This feature, in one non-limiting example, can provide benefits by way of relaxed manufacturing tolerances, allowing for variations in the amount of displacement provided by the shim or poppet seal. That is, the structure (e.g., the poppet seal) being used in the valve housing to provide the displacement/offset from the first terminal position 510 to the first end position 512 and from the second terminal position 518 to the second end position 516 can be manufactured with lower manufacturing tolerances due to the substantially constant spring force over a wide range of displacement values near the first end position 512. In another non-limiting example, this feature can provide a constant spring force should the poppet seal compress or deform over the life of the valve assembly.

Similarly, while not explicitly shown in FIG. 10, a substantially sinusoidal curve (such as the force-deflection spring curve 500) would also yield a substantially constant spring force near a local minima. That is, displacements around the second end position 516 (e.g., left or right from the perspective of FIG. 10) can yield little to no change in the spring force provided by the compliant beams 208. Similar benefits can arise, just as those previously mentioned herein, in relation to the second poppet 204 and the inside of the valve housing.

The force-deflection spring curve 500 of FIG. 10 has been described as being representative of the displacement of the poppet assembly 200. However, force-deflection spring curves for other poppet assemblies described herein can be substantially similar (i.e., substantially sinusoidal), thus the description provided herein of relationships between spring force and poppet deflection can also apply to these other poppet assemblies (e.g., see FIG. 3) and are not limited to the poppet assembly 200 of FIG. 9.

In the non-limiting graphical illustration of FIG. 10, it can be seen that the force-deflection spring curve 500 is substantially asymmetric across the x-axis 502. However, as previously described herein, the dimensions and number of the compliant beams can be designed to provide a particular force-deflection spring curve for a particular application. Thus, the compliant beams can be designed in such a way that the force-deflection spring curve 500 be substantially symmetric across the x-axis 502.

Figure 15:
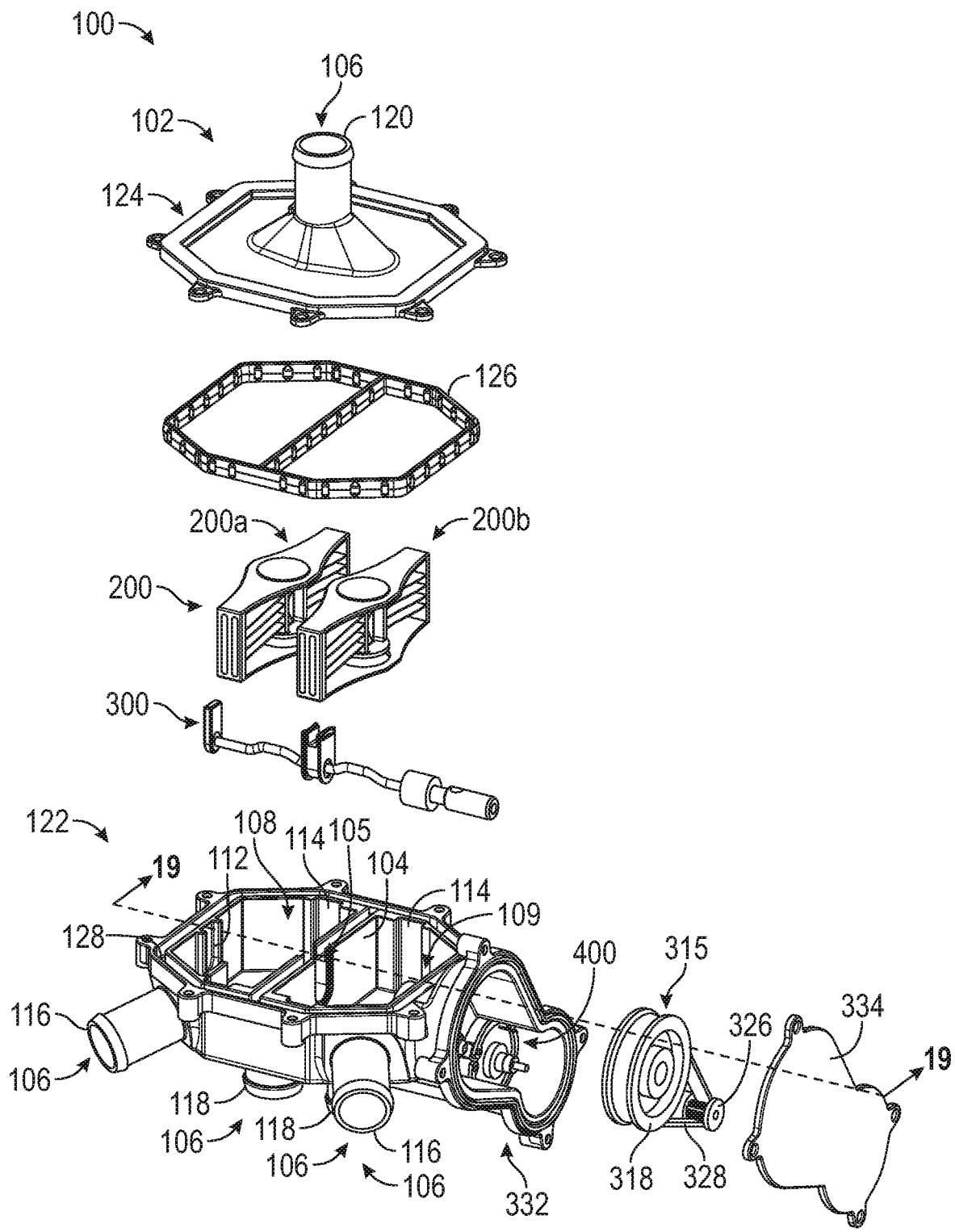
FIG. 15 is an exploded view of a valve assembly according to one aspect of the present disclosure.

FIG. 15 illustrates another non-limiting example of a valve assembly 100 according to the present disclosure. The valve assembly 100 illustrated in FIG. 15 can be substantially similar to the valve assemblies previously described herein, for example the valve assembly illustrated in FIGS. 1-8C, with similar components identified using like reference numerals, except as described herein or apparent from the figures. Aspects that are the same or substantially similar in structure and/or function will not be repeated. As such, it is to be understood that, unless stated or shown otherwise, elements reference with like numerals can function the same or substantially similar to those of the valve assembly 100 of FIGS. 1-8C.

The valve assembly 100 of FIG. 15 can include a valve housing 102 having one or more ports 106. In the illustrated non-limiting example, the valve assembly 100 can include one or more poppet assemblies 200 (e.g., first and second poppet assemblies 200a, 200b) received within the valve housing 102. As previously described herein, the poppet assemblies 200 can be individually and selectively moved or actuated between two or more positions via a crankshaft assembly 300 to provide or inhibit fluid communication to or from the one or more ports 106.

In the illustrated non-limiting example, the valve housing 102 can define a multi-piece construction and include a lower valve housing 122 and an upper valve housing 124. The lower valve housing 122 and the upper valve housing 124 can be coupled together via a plurality of fasteners (not shown). The lower valve housing 122 can include one or more valve sections 107 separated by a dividing wall 104. In the illustrated non-limiting example, the valve housing 102 can include a first valve section 108 and a second valve section 109. The dividing wall 104 can include a bearing support aperture 105 in the form of a slot extending into the dividing wall 104. The lower valve housing 122 can include one or more valve guides 114 in the form of recessed slots extending into the sidewalls of the lower valve housing 122 and extend vertically along at least a portion of the first valve section 108 and the second valve section 109 (e.g., from the perspective of FIG. 15). In the illustrated non-limiting example, each of the first valve section 108 and the second valve section 109 can include a first port 116 and a second port 118.

The upper valve housing 124 can include a third port 120. In the illustrated non-limiting example, the third port 120 can be a shared port between the first valve section 108 and the second valve section 109. That is, the third port 120 can extend over the first valve section 108 and the second valve section 109 and be in fluid communication therewith. The upper valve housing 124 can be substantially flat or planar in shape with the third port 120 extending outwardly therefrom. A gasket 126 can be arranged between the lower valve housing 122 and the upper valve housing 124. The gasket 126 can be received in a gasket groove 128 extending around a periphery of the lower valve housing 102 and along an upper portion of the dividing wall 104. In that way, when the upper valve housing 124 is installed on the lower valve housing 122, the gasket 126 can be configured to prevent external leakage from the valve housing 102 in addition to preventing internal leakage between the first valve section 108 and the second valve section 109.

In the illustrated non-limiting example, each of the first valve section 108 and the second valve section 109 can include a first poppet assembly 200a and a second poppet assembly 200b, respectively. The first poppet assembly 200a and the second poppet assembly 200b can be selectively moved or actuated between two or more positions via the crankshaft assembly 300. The crankshaft assembly 300 can extend at least partially through the valve housing 102 and can be rotatably coupled to the valve housing 102 such that the crankshaft can rotate relative to the valve housing 102. For example, the lower valve housing 122 can include a crankshaft end support 112 that can receive and support a portion of the crankshaft assembly 300. As previously described herein, a portion of the crankshaft assembly 300 (e.g., a pin of the crankshaft) can extend through or be in engagement with each of the one or more poppet assemblies 200.

Figure 16:
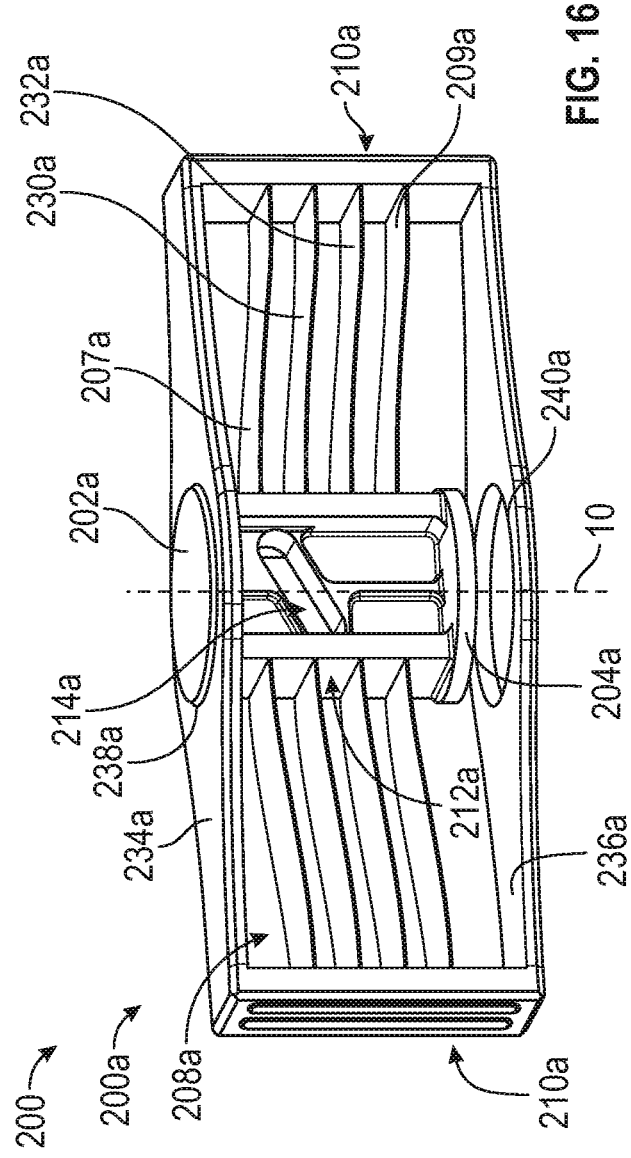
FIG. 16 is a perspective view of a first poppet assembly of the valve assembly of FIG. 15.

As shown in FIG. 16, in one non-limiting example, the first poppet assembly 200a can include a first poppet 202a and a second poppet 204a arranged on opposing ends of the first poppet assembly 200a. The first poppet assembly 200a can include one or more springs. In the illustrated non-limiting example, the springs are in the form of compliant beams 208a. In the illustrated non-limiting example, the first poppet assembly 200a includes a first compliant beam 207a, a second compliant beam 209a, a third compliant beam 230a, and a fourth compliant beam 232a. The first compliant beam 207a and the second compliant beam 209a can be arranged parallel to and spaced apart from one another, with the first compliant beam 207a adjacent to the first poppet assembly 200a and the second compliant beam 209a adjacent to the second poppet 204a. The third compliant beam 230a and fourth compliant beam 232a can be arranged between the first compliant beam 207a and the second compliant beam 209a.

The first poppet assembly 200a can also include one or more side support structures 210a, a center support structure 212a, and a first sliding yoke 214a. The center support structure 212a can span between the first and second poppets 202a, 204a and the first sliding yoke 214a can be arranged between the first compliant beam 207a and the second compliant beam 209a. Each side support structure 210a can be configured to engage one of the valve guides 114 within the valve housing 102 (see FIG. 15). The engagement between the side support structure 210a and the valve guides 114 can rotationally lock the first poppet assembly 200a relative to the valve housing 102. The engagement between the side support structure 210a and the valve guides 114 can also aid in alignment of the first poppet assembly 200a with the ports 106 of the valve housing 102 during assembly.

In the illustrated non-limiting example, the first poppet assembly 200a can also include an upper support structure 234a and a lower support structure 236a. The upper and lower support structure 234a, 236a can extend between, or span, the side support structures 210a. In the illustrated non-limiting example, the upper and lower support structure 234a, 236a can be arranged on opposing ends of the first poppet assembly 200a. For example, upper support structure 234a can be arranged on an upper distal end of the first poppet assembly 200a (e.g., from the perspective of FIG. 16) and the lower support structure 236a can be arranged on a lower distal end of the first poppet assembly 200a opposite the upper support structure 234a. Each of the upper and lower support structures 234a, 236a can include an opening 238a, 240a configured to receive the first poppet 202a and the second poppet 204a, respectively.

In the illustrated non-limiting example, the first sliding yoke 214a can be arranged between the first compliant beam 207a and the second compliant beam 209a. In the illustrated non-limiting example, the first sliding yoke 214a can be integrally formed into the center support structure 212a. The center support structure 212a can define a substantially I-beam shaped cross-section that extends between the first poppet 202a and the second poppet 204a. The first sliding yoke 214a can define a continuous slot that extends through the "web" of the center support structure 212a.

Figure 17:
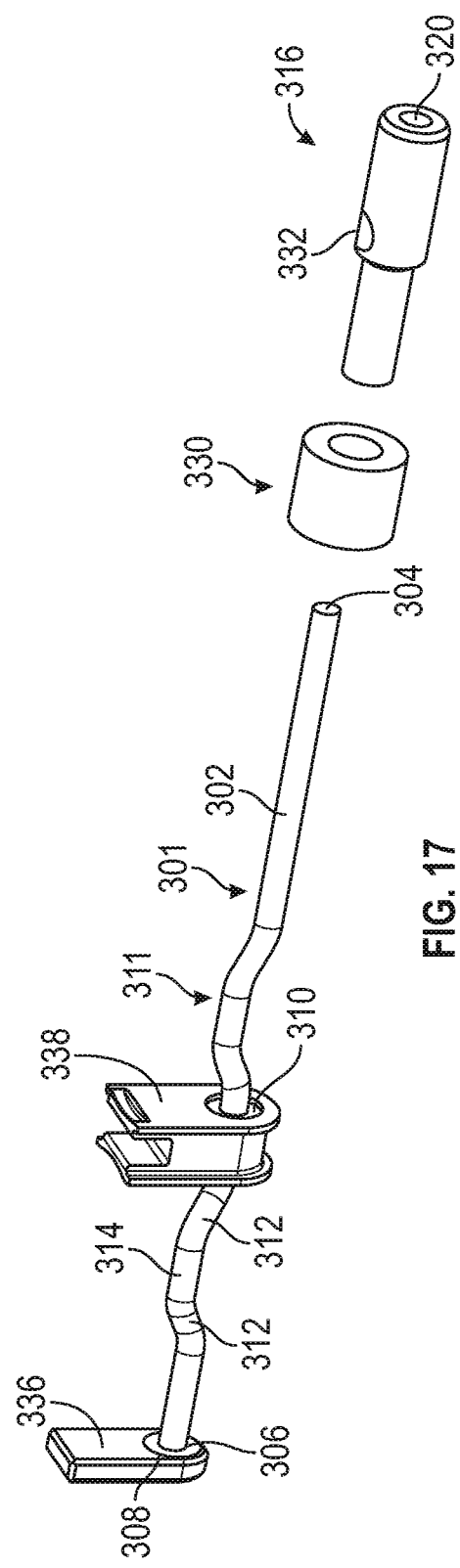
FIG. 17 is a perspective view of a crankshaft assembly of the valve assembly of FIG. 15.
Figure 19:
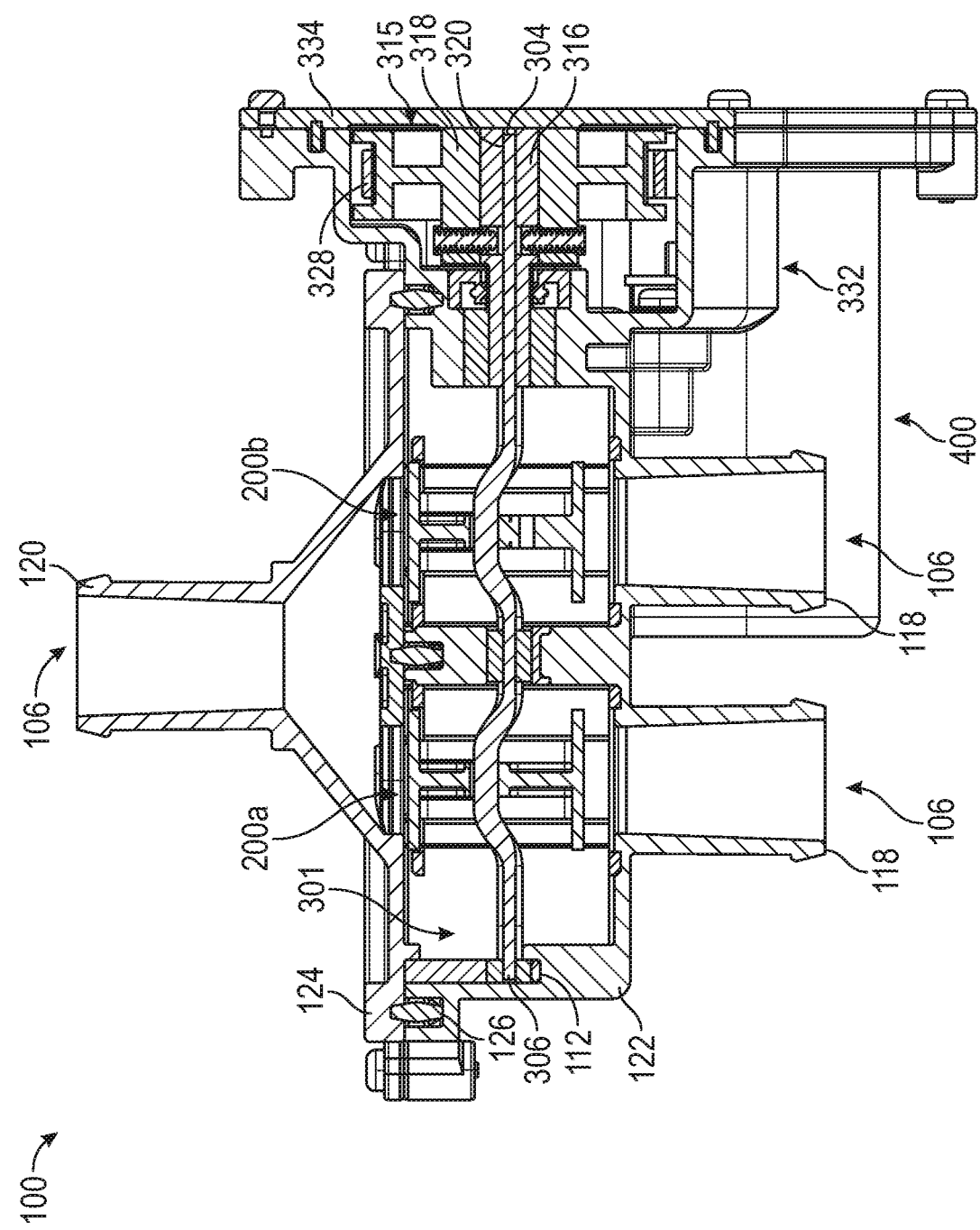
FIG. 19 is a cross-sectional view of the valve assembly of FIG. 15 taken along line 19-19 with the valve assembly in a first configuration.

With reference to FIGS. 17 and 19, the crankshaft assembly 300 can include a crankshaft 301. The crankshaft 301 can define a central shaft 302, a first end 304, and a second end 306. In the illustrated non-limiting example, an actuator 400 can be directly or indirectly coupled to the crankshaft 301 to provide power to rotate the crankshaft 301. For example, the first end 304 of the crankshaft 301 can be coupled to the actuator 400 (e.g., a rotary actuator, a drive motor, etc.) via a torque reduction device 315 (e.g., a belt and pulley drive system) configured to rotate the crankshaft 301 in a desired direction. In some non-limiting examples, the actuator 400 can include a position sensor configured to detect a rotational position of the crankshaft 301.

In the illustrated non-limiting example, a coupling component 316 can be coupled between the first end 304 of the crankshaft 301 and a crankshaft pulley 318. The coupling component 316 can include an aperture 320 extending therethrough to receive the first end 304 of the crankshaft 301. In some non-limiting examples, the crankshaft 301 can be press-fit into the aperture 320, such that the coupling component 316 can be rotationally locked with the crankshaft 301. The coupling component 316 can also be coupled to the crankshaft pulley 318. In the illustrated non-limiting example, the coupling component can include a pair of opposing threaded apertures 322 that can correspond or align with a pair of threaded apertures 324 in the crankshaft pulley 318. When assembled, the threaded apertures 322, 324 can be aligned and a set screw can be threaded therethrough such that the coupling component 316 can be rotationally locked with the crankshaft pulley 318.

The torque reduction device 315 can include the crankshaft pulley 318 and an actuator pulley 326. In the illustrated non-limiting example, the crankshaft pulley 318 and the actuator pulley 326 can be rotatably coupled together via a belt 328. In that way, a torque or rotary output from the actuator 400 can be transferred to the crankshaft 301, such that the crankshaft 301 can actuate the first and second poppet assemblies 200a, 200b. As illustrated in FIG. 15, the torque reduction device 315 can include a predefined torque reduction ratio. The predefined torque reduction ratio can be defined by a pitch diameter of the crankshaft pulley 318 over a pitch diameter of the actuator pulley 326. In other non-limiting examples, the torque reduction device 315 can include a set of meshed gears, sprockets, chains, a set of planetary gears, etc.

The torque reduction ratio can provide a multi-stable or proportional functionality for the first and second poppet assemblies 200a, 200b. For example, the first and second poppet assemblies 200a, 200b can be maintained in a position (such as an end position, or any position therebetween) without power being applied to the actuator 400. In some non-limiting examples, external forces can be applied to the first and second poppet assemblies 200a, 200b (e.g., via pressures acting on the poppets 202, 204). The external forces applied to the first and second poppet assemblies 200a, 200b can transfer a force back on the crankshaft 301 due to the engagement between the pin 314 and the sliding yoke 214, for example. The force transferred back on the crankshaft 301 can result in a torque being applied to the crankshaft pulley 318 through the crankshaft 301. The predefined torque reduction ratio can proportionately reduce the torque applied through the crankshaft 301 as it gets transferred to the actuator 400 via the torque reduction device 315, such that the torque becomes reduced enough such that a rotary position of the actuator 400 can be maintained without power being applied to the actuator 400. In that way, the first and second poppet assemblies 200a, 200b can be maintained in their respective positions, including an end position or any position between opposing end positions, irrespective of external forces applied thereto, without power being applied to the actuator 400.

In some non-limiting examples, the torque reduction device 315 can be received within a housing 332. In the illustrated non-limiting example, the valve housing 102 can be incorporate in, or integral to, the valve housing 102. The housing 332 can include a housing cover 334 coupled to the housing 332 to encapsulate and enclose the torque reduction device 315. In some non-limiting examples, the first end 304 of the crankshaft 301 can protrude outside of the valve housing 102 (see FIG. 19) to allow the engagement with the actuator 400. In the illustrated non-limiting example, the first end 304 of the crankshaft 301 can be the only portion of the crankshaft assembly 300 that protrudes from, or is arranged external to, the valve housing 102. In some non-limiting examples, only a single external dynamic seal 330 may be required to prevent leakage outside of the valve housing 102. For example, the dynamic seal 330 can be arranged between the first end 304 of the crankshaft 301 and the valve housing 102 to prevent external leakage. In the illustrated non-limiting example, the dynamic seal 330 is coupled between the coupling component 316 and the valve housing 102.

In the illustrated non-limiting example, the crankshaft assembly 300 can also include a thrust bearing 308 and a center bearing 310. The second end 306 of the crankshaft 301 can be at least partially received within and rotatably coupled to the crankshaft end support 112 (see FIG. 19. The thrust bearing 308 can be arranged on the central shaft 302 adjacent to the second end 306 and can extend radially outward from the central shaft 302. In the illustrated non-limiting example, the thrust bearing 308 can be received within a tab-shaped bearing carriage 336. When assembled, the bearing carriage 336 can be received in a recessed slot of the crankshaft end support 112. The center bearing 310 can be received within tab-shaped seal 338 and can be rotatably coupled to the central shaft 302. The seal 338 can be received in the recessed slot of the bearing support aperture 105 (see FIG. 19). In some aspects, the seal 338 can be configured to prevent internal fluid leakage between first valve section 108 and the second valve section 109.

Figure 18A:
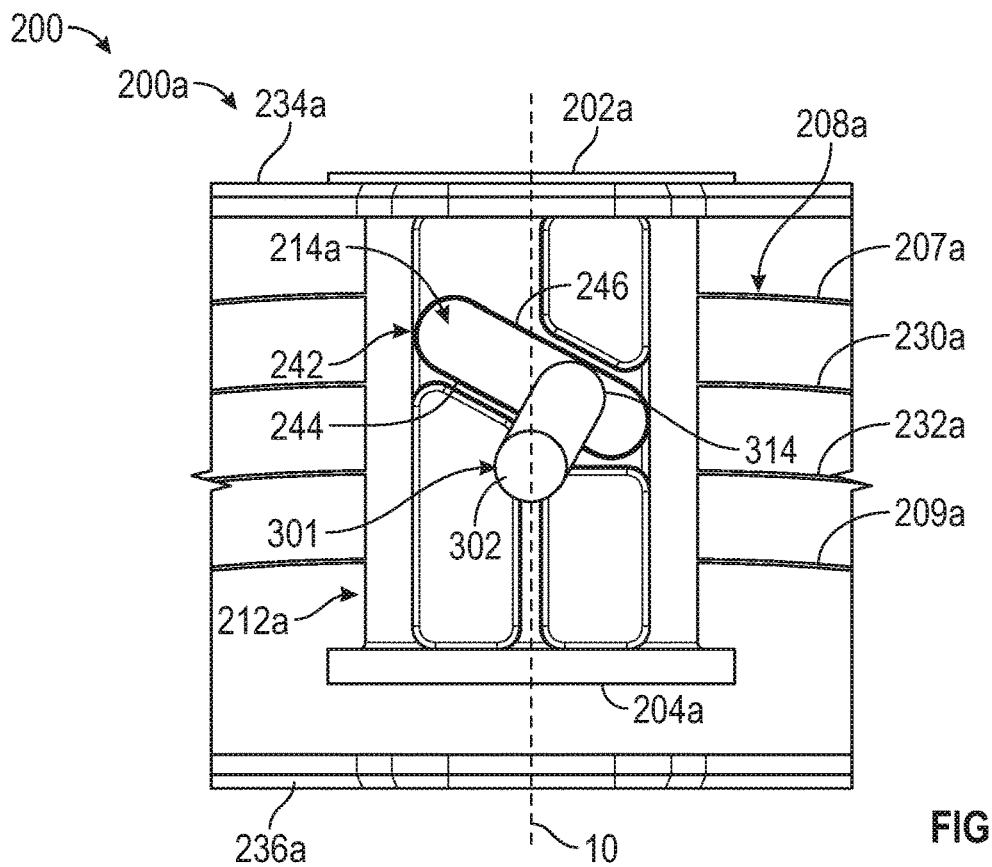
FIG. 18A is a side view of the first poppet assembly of FIG. 16.
Figure 18B:
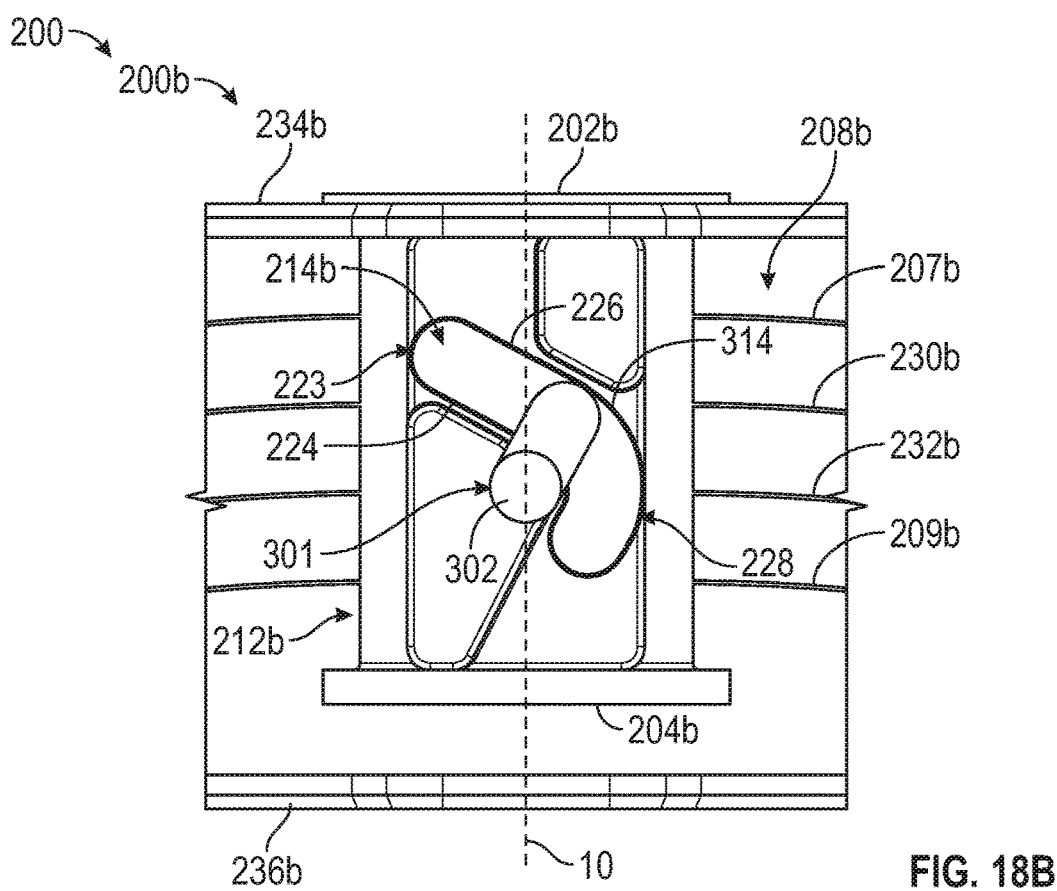
FIG. 18B is a side view of a second poppet assembly of the valve assembly of FIG. 15.

Referring now to FIGS. 18A-18B, the crankshaft 301 can include one or more pins 314 configured to engage the sliding yokes 214a, 214b of the one or more poppet assemblies 200 to facilitate moving the one or more poppet assemblies 200 between end positions. The pins 314 can be slidably coupled to the first sliding yoke 214a and the second sliding yoke 214b (see, e.g., FIG. 19B). When assembled, the first sliding yoke 214a can be arranged between the throw arms 312 of one of the throws 311 and the second sliding yoke 214b can be arranged between the throw arms 312 of another one of the throws 311. In this way, for example, the pin 314 of one of the throws 311 can extend through and engage the first sliding yoke 214a and the pin 314 of another of the throws 311 can extend through and engage the second sliding yoke 214b.

In the illustrated non-limiting example, the crankshaft 301, throw arms 312, and pins 314 can be formed as a single unitary component. For example, the crankshaft 301 can be formed from a single rod or tube. The rod can then be bent at various areas along a length of the crankshaft 301 to form the throw arms 312 and the pins 314 thereon. Forming of the crankshaft 301 as a single unitary component can reduce the overall number of parts, complexity, and number manufacturing operations for the crankshaft assembly 300, thereby reducing a manufacturing cost.

As illustrated in FIG. 18A, the first sliding yoke 214a can define a geometry that includes an angled portion 242. In general, the angled portion 242 can define a continuous slot within which the pin 314 can be received. In the illustrated non-limiting example, the angled portion 242 can be arranged within the center support structure 212a. In the illustrated non-limiting example, the angled portion 242 can include a first angled wall 244 and a second angled wall 246 and the pin 314 can be received between the first angled wall 244 and the second angled wall 246.

As previously noted herein, the crankshaft 301 can selectively actuate the first and second poppet assemblies 200a, 200b between a first end position and a second end position. The crankshaft 301 can displace the first and second poppet assemblies 200a, 200b axially (e.g., along axis 10) between the first end position and the second end position. In the illustrated non-limiting example of FIG. 18A, rotation of the crankshaft 301 in a first direction (e.g., a clockwise direction) can bring the pin 314 into engagement with the first angled wall 244 of the first sliding yoke 214a, thereby applying a force to the first poppet assembly 200a to move from a first end position towards a second end position (e.g., a downward direction relative to the central shaft 302 from the perspective of FIG. 18A). To return to the illustrated position of FIG. 18A, rotation of the crankshaft 301 in a second direction (e.g., a counterclockwise direction) can bring the pin 314 into engagement with the second angled wall 246, thereby applying a force to the first poppet assembly 200a to move from the second end position towards the first end position (e.g., an upward direction relative to the central shaft 302 from the perspective of FIG. 18A).

Similarly, starting from the illustrated position of FIG. 18A, rotation of the crankshaft 301 in the second direction (e.g., a counterclockwise direction) can bring the pin 314 into engagement with the first angled wall 244, thereby applying a force to the first poppet assembly 200a to move from the first end position towards the second end position (e.g., the downward direction relative to the central shaft 302 from the perspective of FIG. 18A). To return to the illustrated position of FIG. 18A, rotation of the crankshaft assembly 300 in the first direction (e.g., a clockwise direction) can bring the pin 314 into engagement with the second angled wall 246, thereby applying a force the first poppet assembly 200a to move from the second end position towards the first end position (e.g., the upward direction relative to the central shaft 302 from the perspective of FIG. 18A).

As illustrated in FIG. 18B, the second poppet assembly 200b can include similar features as the first poppet assembly 200a, with similar components identified using like reference numerals with a "b" suffix, except as described herein or apparent from the figures. In the illustrated non-limiting example, the second sliding yoke 214b can define a geometry that can include an angled portion 223 and a curved portion 228. In general, the angled portion 223 and the curved portion 228 can define a continuous slot within which the pin 314 can be received. In the illustrated non-limiting example, the angled portion 223 can include a first angled wall 224 and the pin 314 can be received between the first angled wall 224 and the second angled wall 226.

In the illustrated non-limiting example of FIG. 18B, rotation of the crankshaft 301 in a first direction (e.g., a clockwise direction) can result in the pin 314 traveling along the curved portion 228, thereby maintaining the second poppet assembly 200b in a first end position. A subsequent rotation of the crankshaft 301 in a second direction (e.g., a counterclockwise direction) can result in the pin 314 again traveling along the curved portion 228 back to the illustrated position of FIG. 18B. The movement of the pin 314 traveling back along the curved portion allows the second poppet assembly 200b to remain in the first end position.

Alternatively, starting from the illustrated position of FIG. 18B, rotation of the crankshaft 301 in the second direction (e.g., the counterclockwise direction) can bring the pin 314 into engagement with the first angled wall 224, thereby applying a force to the second poppet assembly 200b to move from the first end position towards a second end position (e.g., the downward direction relative to the central shaft 302 from the perspective of FIG. 18B). To return to the illustrated position of FIG. 18B, rotation of the crankshaft 301 in the first direction (e.g., the clockwise direction) can bring the pin 314 into engagement with the second angled wall 226, thereby applying a force to the second poppet assembly 200b to move from the second end position towards the first end position (e.g., the upward direction relative to the central shaft 302 from the perspective of FIG. 18B).

One non-limiting example of operation of the valve assembly 100 will be described with reference to FIGS. 18A-19. In general, the integration of compliant beams into the poppet assemblies 200 and/or the torque reduction device 315 installed onto the crankshaft 301 can enable the poppet assemblies 200 to define multi-stable functionality. As previously described herein, the first poppet assembly 200a and the second poppet assembly 200b can define a bi-stable functionality, which enables the valve assembly 100 to be operable in a plurality of configurations to provide varying flow paths. For example, each of the first poppet assembly 200a and the second poppet assembly 200b can be selectively moveable between a first end position (see FIG. 19) and a second end position (not shown). In some non-limiting examples, each of the first poppet assembly 200a and the second poppet assembly 200b can be individually and selectively moveable between a first end position (see FIG. 19) and a second end position (not shown) depending on a direction of rotation of the crankshaft 301 and the geometry defined by the first and second sliding yokes 214a, 214b.

In the non-limiting example illustrated in FIGS. 18A-19, the valve assembly 100 can be selectively actuated between a first configuration (FIG. 19), a second configuration (not shown), and a third configuration (not shown). FIG. 19 illustrates the valve assembly 100 in a first configuration, where the first poppet assembly 200a and the second poppet assembly 200b are in a first end position and the crankshaft 301 is in a neutral position. As previously described herein with respect to FIGS. 6A-8C, actuation of the crankshaft 301 in a desired direction at a predetermined magnitude can selectively actuate the valve assembly 100, including the first and second poppet assemblies 200a, 200b, between the first configuration, the second configuration, and the third configuration.

Figure 20:
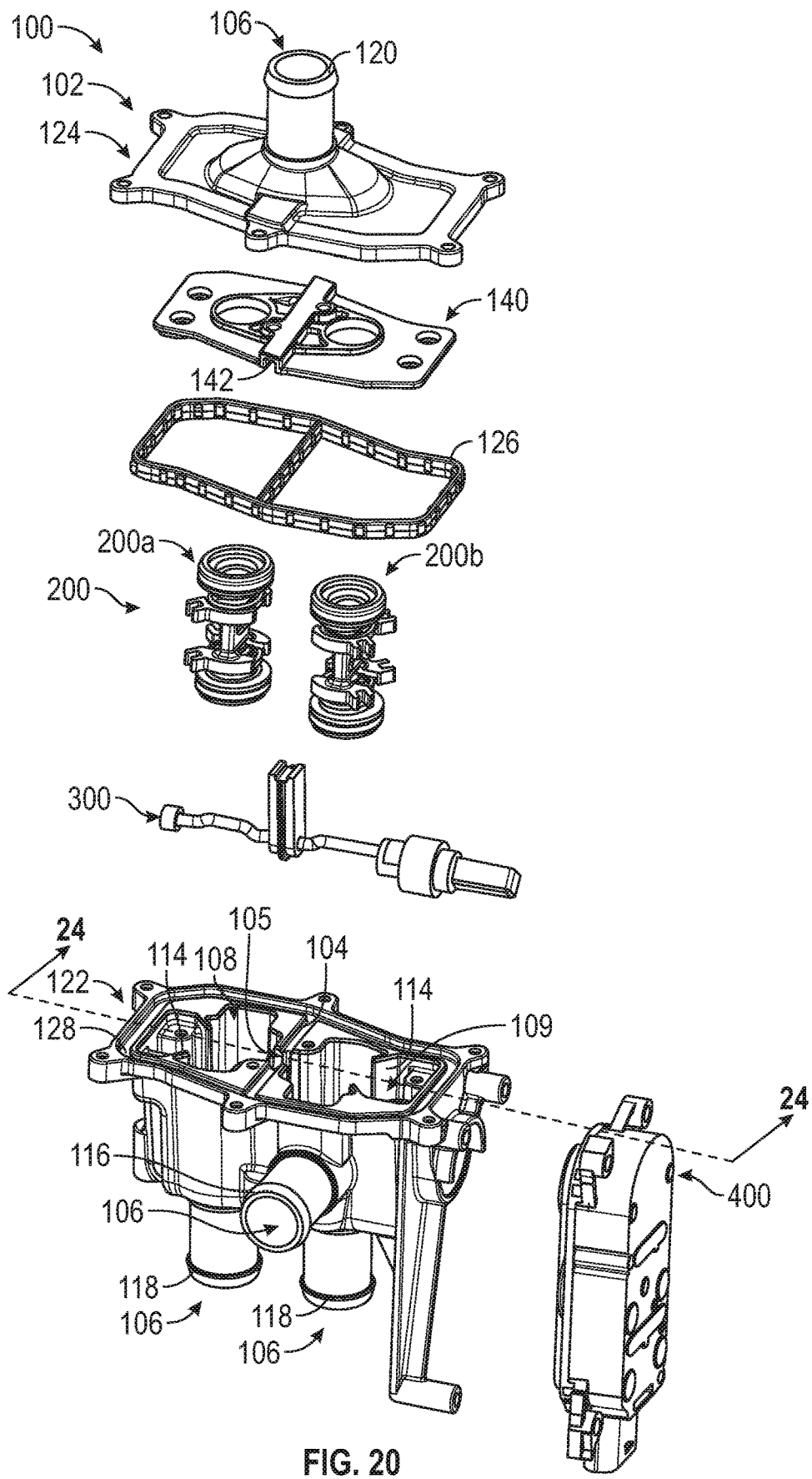
FIG. 20 is an exploded view of a valve assembly according to one aspect of the present disclosure.

FIG. 20 illustrates another non-limiting example of a valve assembly 100 according to the present disclosure. The valve assembly 100 illustrated in FIG. 20 can be substantially similar to the valve assemblies previously described herein, with similar components identified using like reference numerals, except as described herein or apparent from the figures. Aspects that are the same or substantially similar in structure and/or function will not be repeated. As such, it is to be understood that, unless stated or shown otherwise, elements reference with like numerals can function the same or substantially similar to those of the valve assembles previously described herein.

The valve assembly 100 of FIG. 20 can include a valve housing 102 having one or more ports 106. In the illustrated non-limiting example, the valve assembly 100 can include one or more poppet assemblies 200 (e.g., first and second poppet assemblies 200a, 200b) received within the valve housing 102. As previously described herein, the poppet assemblies 200 can be individually and selectively moved or actuated between two or more positions via a crankshaft assembly 300 to provide or inhibit fluid communication to or from the one or more ports 106.

In the illustrated non-limiting example, the valve housing 102 can define a multi-piece construction and include a lower valve housing 122 and an upper valve housing 124. The lower valve housing 122 and the upper valve housing 124 can be coupled together via a plurality of fasteners (not shown). In the illustrated non-limiting example, the valve housing 102 can include a valve plate 140 that can be coupled to the lower valve housing 122 between the upper valve housing 124 and the lower valve housing 122. The valve plate 140 can provide a valve seat or sealing surface for the first and second poppet assemblies 200a, 200b. In other non-limiting examples, the valve plate 140 can be integrally formed into the upper valve housing 124 as a unitary component.

The lower valve housing 122 can include one or more valve sections 107 separated by a dividing wall 104. In the illustrated non-limiting example, the valve housing 102 can include a first valve section 108 and a second valve section 109. The dividing wall 104 can include a bearing support aperture 105 in the form of a slot extending into the dividing wall 104. The lower valve housing 122 can include one or more valve guides 114 in the form of inwardly extending protrusions that extend into each of the first valve section 108 and a second valve section 109 of the lower valve housing 122 and extend vertically along at least a portion of the first valve section 108 and the second valve section 109 (e.g., from the perspective of FIG. 15). In the illustrated non-limiting example, each of the first valve section 108 and the second valve section 109 can include a first port 116 and a second port 118. It is to be understood that the first port 116 of the first valve section 108 is positioned on a backside of the lower valve housing 122 (e.g., from the perspective of FIG. 20) and is thus not shown in this illustration.

The upper valve housing 124 can include a third port 120. In the illustrated non-limiting example, the third port 120 can be a shared port between the first valve section 108 and the second valve section 109. A gasket 126 can be arranged between the lower valve housing 122 and the upper valve housing 124. The gasket 126 can be received in a gasket groove 128 extending around a periphery of the lower valve housing 102 and along an upper portion of the dividing wall 104. In that way, when the upper valve housing 124 is installed on the lower valve housing 122, the gasket 126 can be configured to prevent external leakage from the valve housing 102 in addition to preventing internal leakage between the first valve section 108 and the second valve section 109. In the illustrated non-limiting example, the valve plate 140 can also include a gasket groove 142. The gasket groove 142 can be configured to increase compression on a portion of the gasket 126 that is received along the upper portion of the dividing wall 104. The increased compression on the gasket 126 can prevent leakage between the first valve section 108 and the second valve section 109.

In the illustrated non-limiting example, each of the first valve section 108 and the second valve section 109 can include a first poppet assembly 200a and a second poppet assembly 200b, respectively. The first poppet assembly 200a and the second poppet assembly 200b can be selectively moved or actuated between two or more positions via the crankshaft assembly 300. The crankshaft assembly 300 can extend at least partially through the valve housing 102 and can be rotatably coupled to the valve housing 102 such that the crankshaft can rotate relative to the valve housing 102. For example, the lower valve housing 122 can include a crankshaft end support 112 (see FIG. 24) that can receive and support a portion of the crankshaft assembly 300. As previously described herein, a portion of the crankshaft assembly 300 (e.g., a pin of the crankshaft) can extend through or be in engagement with each of the one or more poppet assemblies 200.

Figure 21:
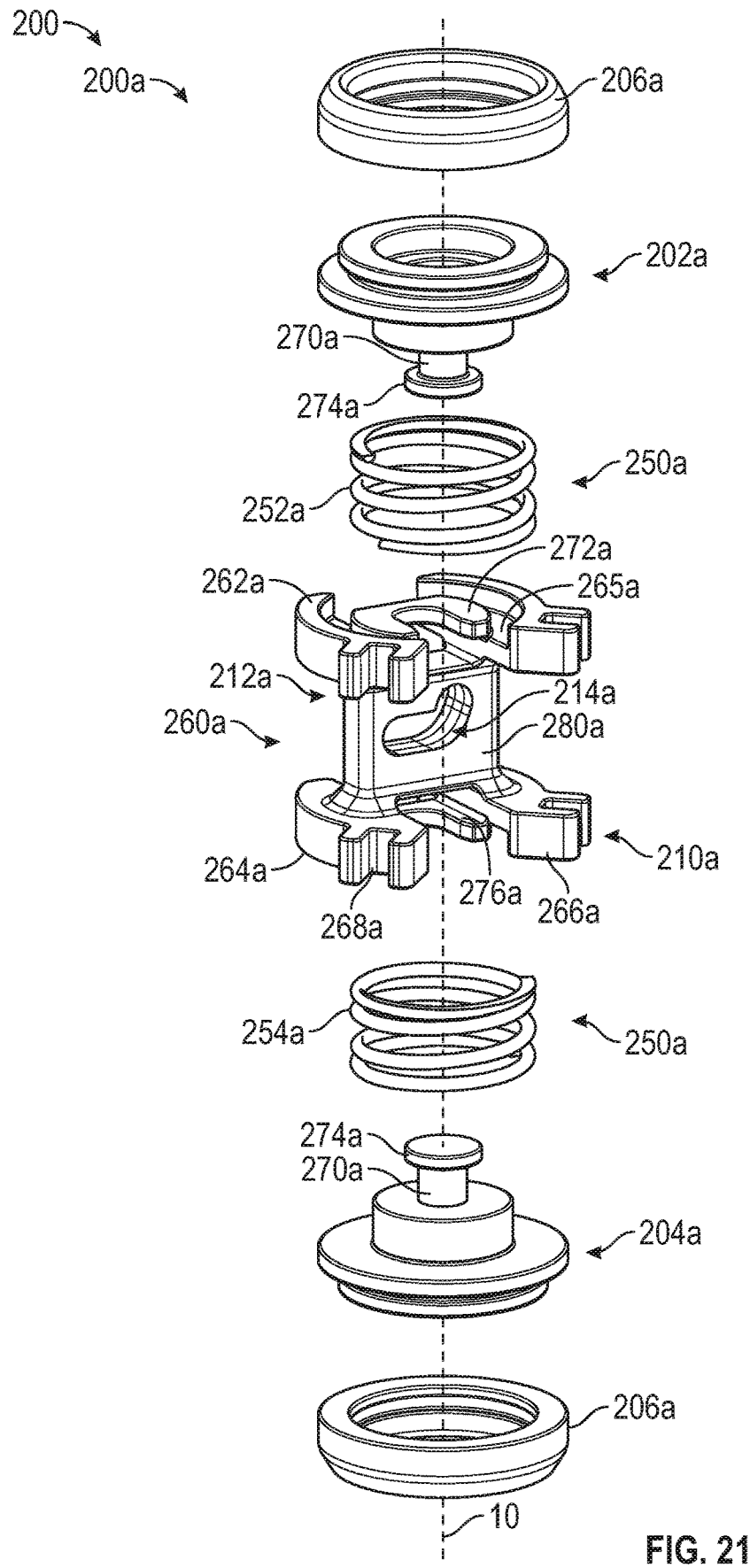
FIG. 21 is a perspective view of a first poppet assembly of the valve assembly of FIG. 20.

As shown in FIG. 21, in one non-limiting example, the first poppet assembly 200a can include a first poppet 202a and a second poppet 204a arranged on opposing ends of the first poppet assembly 200a. A poppet seal 206a can be provided on the first and second poppets 202a, 204a that extends along the periphery of the first and second poppets 202a, 204a. In the illustrated non-limiting example, the poppet seal 206a can be coupled to (e.g., snapped in place or otherwise installed onto) the first and second poppets 202a, 204a during valve assembly.

The first poppet assembly 200a can include one or more springs. In the illustrated non-limiting example, the springs are in the form of coil springs 250a. In the illustrated non-limiting example, the first poppet assembly 200a includes a first coil spring 252a and a second coil spring 254a. The first coil spring 252a and the second coil spring 254a can be axially spaced apart from one another, with the first coil spring 252a adjacent to the first poppet 202a and the second coil spring 254a adjacent to the second poppet 204a.

The first poppet assembly 200a can also include a center support structure 212a in the form of a poppet carriage 260a and a first sliding yoke 214a. The poppet carriage 260a can be arranged between the first and second poppets 202a, 204a. The first coil spring 252a can be arranged between the first poppet 202a and a first end 262a of the poppet carriage 260a and the second coil spring 254a can be arranged between the second poppet 204a and a second end 264a of the poppet carriage 260a. Each of the first end 262a and the second end 264a of the first poppet assembly 200a include a spring recess 265a extending axially into the poppet carriage 260a. The spring recesses 265a can locate the coil springs 250a to keep them in alignment relative to the poppet carriage 260a.

The first poppet assembly 200a can include one or more side support structures 210a configured to engage one of the valve guides 114 within the valve housing 102 (see FIG. 15). In the illustrated non-limiting example, the side support structures 210a can be in the form of tabs 266a extending radially outward from the poppet carriage 260a. The tabs 26a can include a slot 268a extending axially therethrough. The slot 268a can be configured to receive the inwardly protrusions of the valve guides 114 in the lower valve housing 122. The engagement between the tabs 266a and the valve guides 114 can rotationally lock the first poppet assembly 200a relative to the valve housing 102, allowing motion only along the poppet axis 10. The engagement between the tabs 266a and the valve guides 114 can also aid in alignment of the first poppet assembly 200a with the ports 106 of the valve housing 102 during assembly.

In the illustrated non-limiting example, the first poppet 202a and the second poppet 204a can be slidably coupled to the poppet carriage 260a. For example, each of the first and second poppets 202a, 204a can include a cylindrical pin 270a extending axially away from the respective first poppet 202a or the second poppet 204a. A flange 274a can be arranged at a distal end of the cylindrical pin 270a to limit the axial displacement of the first and second poppets 202a, 204a relative to the poppet carriage 260a. The cylindrical pin 270a can be slidably received within a generally U-shaped slot 272a arranged on the first and second ends 262a, 264a of the poppet carriage 260a. The coil springs 250a can be configured to bias the first and second poppets 202a, 204a until the flange 274a engages, or becomes seated against, an inner surface 276a of the U-shaped slot 272a. Thus, the first and second poppets 202a, 204a can move axially relative to the poppet carriage 260a.

Referring still to FIG. 21, the first sliding yoke 214a can be arranged between the first end 262a and the second end 264a of the poppet carriage 260a. In the illustrated non-limiting example, the first sliding yoke 214a can be integrally formed into a central portion 280a of the poppet carriage. The first sliding yoke 214a can define a continuous slot that extends through the central portion 280a of the poppet carriage 260a.

Figure 22:
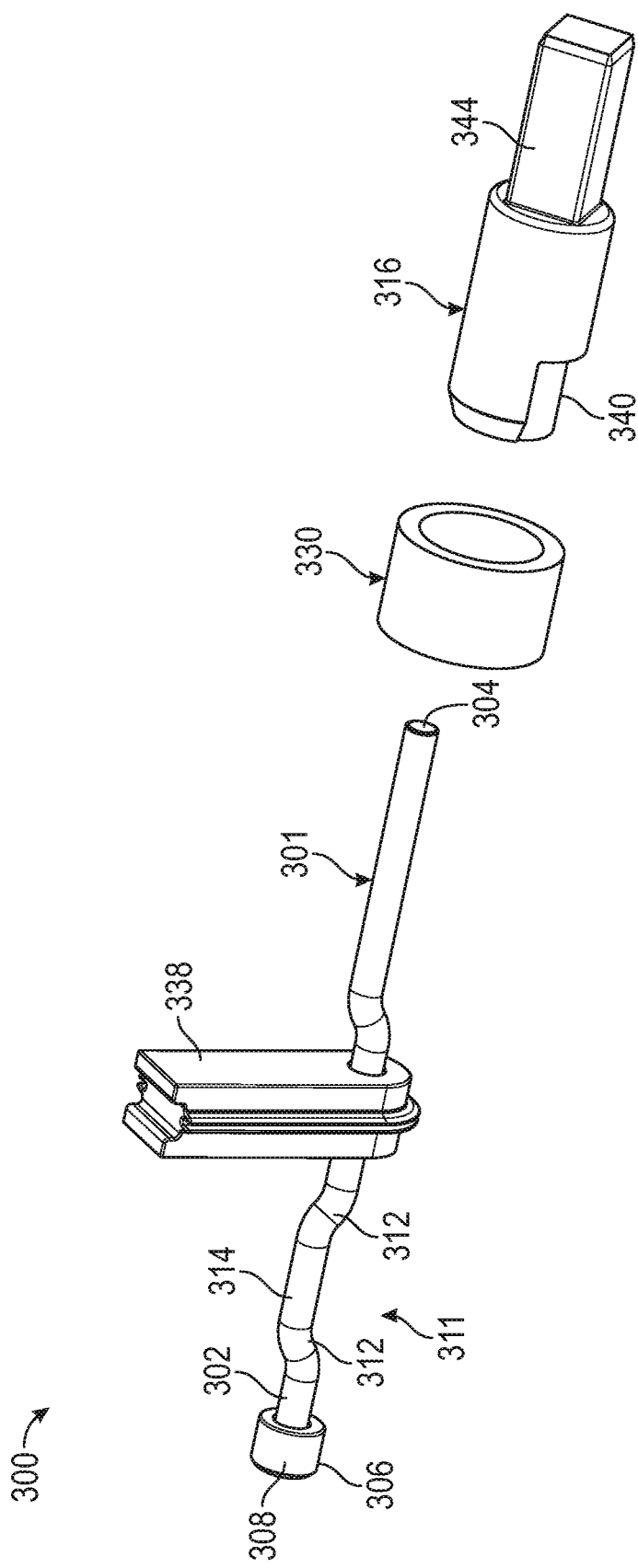
FIG. 22 is a perspective view of a crankshaft assembly of the valve assembly of FIG. 20.
Figure 24:
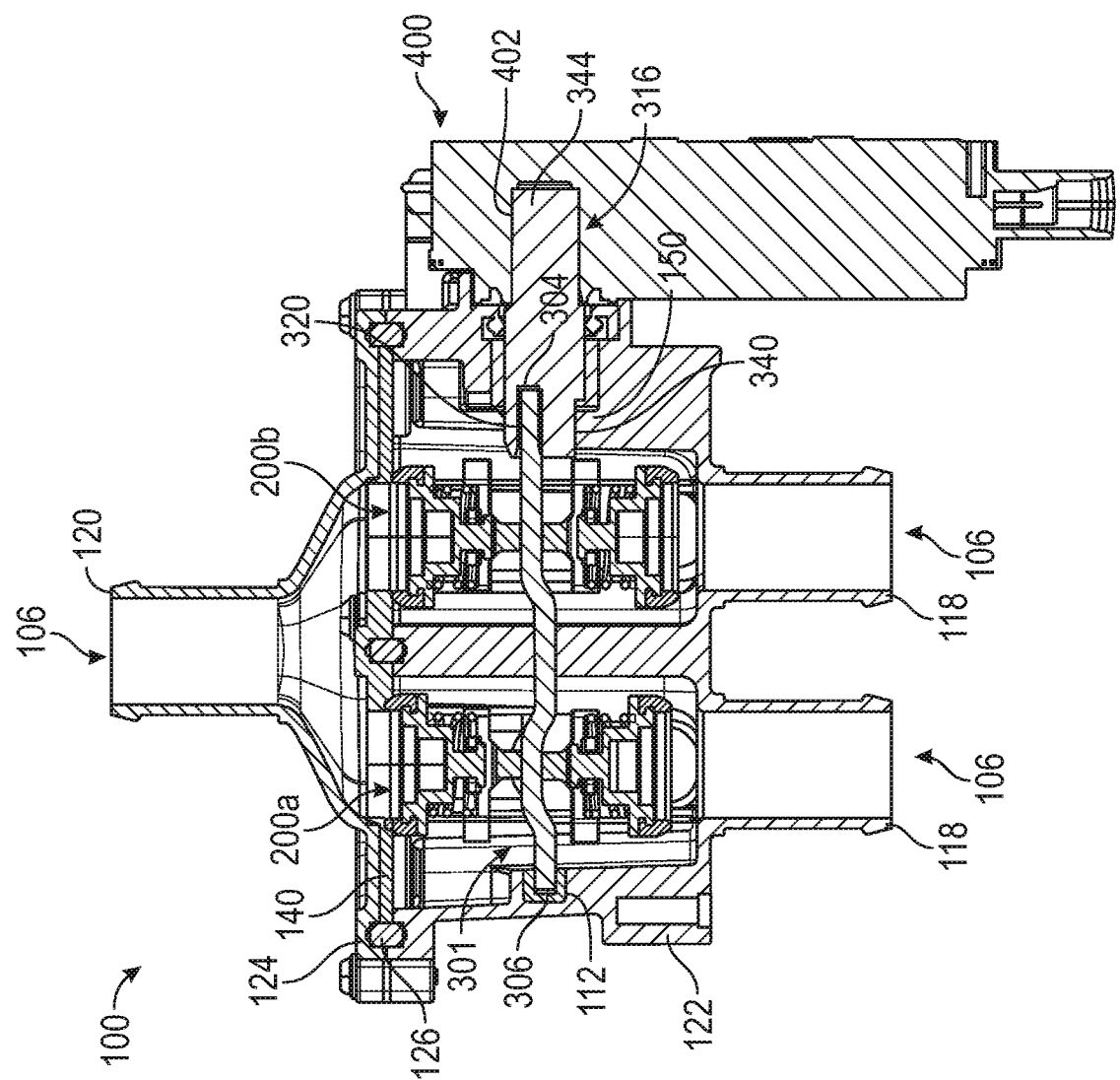
FIG. 24 is a cross-sectional view of the valve assembly of FIG. 20 taken along line 24-24 with the valve assembly in a first configuration.

With reference to FIGS. 22 and 24, the crankshaft assembly 300 can include a crankshaft 301. The crankshaft 301 can define a central shaft 302, a first end 304, and a second end 306. In the illustrated non-limiting example, the first end 304 can be radially offset from the second end 306. In some non-limiting examples, the first end 304 can be radially aligned with a pin 314 of the crankshaft 301. The radial offset of the first end 304 can reduce the number of bends or changes in geometry of the crankshaft 301, thereby helping reduce the manufacturing costs associated with the crankshaft 301.

In the illustrated non-limiting example, an actuator 400 can be directly or indirectly coupled to the crankshaft 301 to provide power to rotate the crankshaft 301. For example, the first end 304 of the crankshaft 301 can be coupled to the actuator 400 (e.g., a rotary actuator, a drive motor, etc.) via a torque reduction device (not shown) configured to rotate the crankshaft 301 in a desired direction. In the illustrated non-limiting example, the torque reduction device can be integrated into the actuator 400. As previously described herein, the torque reduction device, can provide a multistable functionality for the first and second poppet assemblies 200a, 200b. For example, the first and second poppet assemblies 200a, 200b can be maintained in a position without power being applied to the actuator 400. In the illustrated non-limiting example, the first and second popper assemblies 200a, 200b do not include the compliant members previously described herein. However, as described above, the torque reduction device can provide a multistable functionality, at least due to its ability to hold a torque and/or maintain a position of the first and second popper assemblies 200a, 200b with zero power input from the actuator.

In addition, during operation of the valve assembly 100, a pressure forces that may act on the poppet assemblies 200 can provide similar holding forces to those generated by the compliant members previously described herein. In some non-limiting examples, pressure forces from fluid within and/or coming into or out of the valve assemblies 100 may be generated in a direction that closes a poppet (e.g., one or more of poppets 202a, 202b, 204a, 204b). For example, one of the first poppet 202a, 202b or the second poppet 204a, 204b can seal against the valve housing 102 to inhibit fluid flow to or from one of the first port 116, the second port 118, or the third port 120. In some non-limiting examples, the pressure forces from fluid within and/or coming into or out of the valve assemblies 100 may act to close a poppet that is closest to an end position. For example, the pressure forces can act in a direction such that the poppet that is closest to the valve plate 140 or the inside of the valve housing 102 is moved into contact with the valve plate 140 or the inside of the valve housing 102 to inhibit fluid flow to the corresponding port. In some non-limiting examples, the pressure forces acting on the poppets can result in a force curve that is similar to that shown in FIG. 10 previously described herein. It is to be understood by those skilled in the art that by orienting the ports and pressures in a desired manner (e.g., such as the valve assemblies 100 herein), pressure forces can be utilized to replicate similar force characteristics as the compliant beams previously described herein.

In the illustrated non-limiting example, a coupling component 316 can be coupled between the first end 304 of the crankshaft 301 and a crankshaft pulley 318. The coupling component 316 can include an aperture 320 extending therethrough to receive the first end 304 of the crankshaft 301 (see FIG. 24). In the illustrated non-limiting example, the aperture 320 can be non-concentric to the body of the coupling component 316, such that the aperture 320 radially aligns with the first end 304 of the crankshaft 301. In some non-limiting examples, the coupling component 316 can be rotationally locked with the crankshaft 301. In the illustrated non-limiting example, the coupling component 316 can include a radial recess 340. The radial recess 340 can be configured to receive a tab 150 inside the valve housing 102 when the coupling component 316 is installed into the valve housing 102. The tab 150 can act as a mechanical rotational end stop for rotation of the coupling component 316, and thereby the crankshaft 301. For example, the tab 150 can engage ends of the radial recess 340 to limit the rotation of the crankshaft 301 in a predefined range. For example, rotation of the crankshaft 301 can be mechanically limited to rotate in a range between zero and about 360°. In some non-limiting examples, rotation of the crankshaft 301 can be mechanically limited to rotate in a range between zero and about 270°. In other non-limiting examples, rotation of the crankshaft 301 can be mechanically limited to rotate in a range between zero and about 180°.

The coupling component 316 can also be coupled to the actuator 400. In the illustrated non-limiting example, the coupling component can include a square-shaped end 344. When assembled, the square-shaped end 344 of the coupling component 316 can be inserted into a complementarily shaped opening 402 in the actuator 400 such that the actuator can rotate the coupling component 316, and thereby actuate or rotate the crankshaft 301.

Figure 23A:
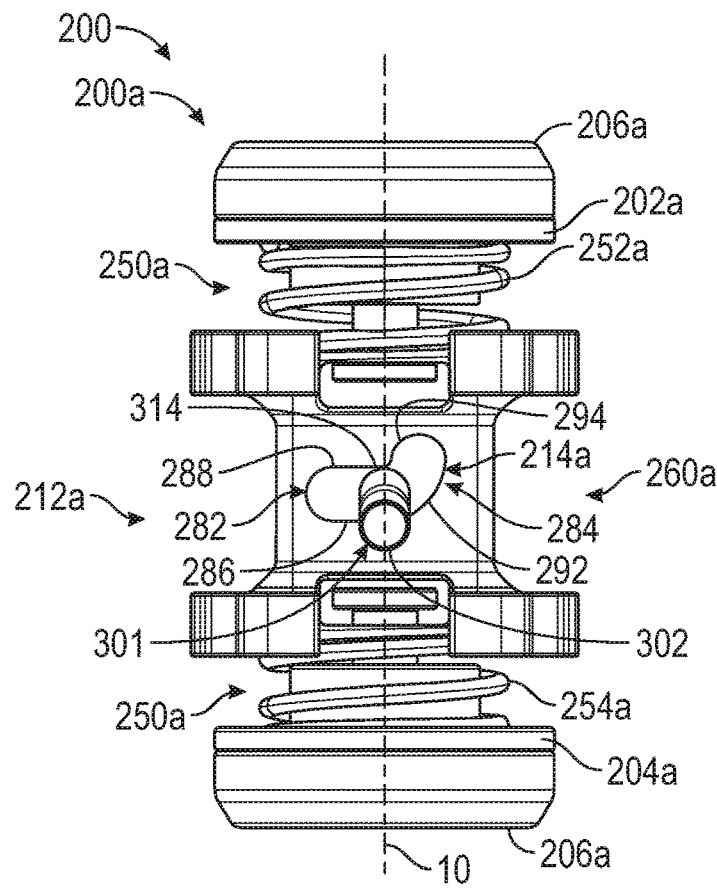
FIG. 23A is a side view of the first poppet assembly of FIG. 21.
Figure 23B:
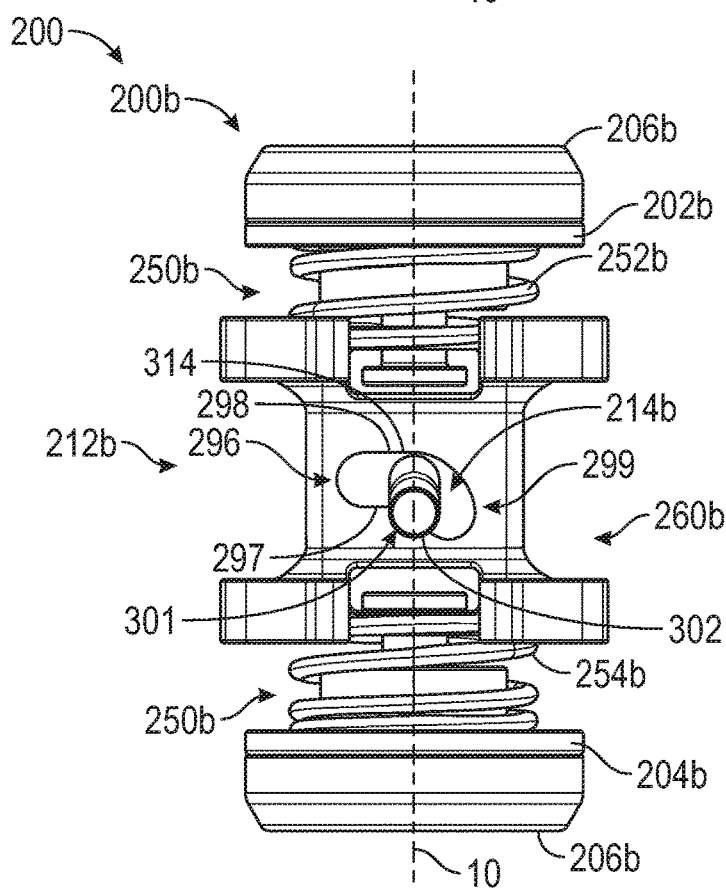
FIG. 23B is a side view of a second poppet assembly of the valve assembly of FIG. 20.

Referring now to FIGS. 23A-23B, the crankshaft 301 can include one or more pins 314 configured to engage the sliding yokes 214a, 214b of the one or more poppet assemblies 200 to facilitate moving the one or more poppet assemblies 200 between end positions. The pins 314 can be slidably coupled to the first sliding yoke 214a and the second sliding yoke 214b. When assembled, the first sliding yoke 214a can be arranged between the throw arms 312 of one of the throws 311 and the second sliding yoke 214b can be arranged between the throw arms 312 of another one of the throws 311. In this way, for example, the pin 314 of one of the throws 311 can extend through and engage the first sliding yoke 214a and the pin 314 of another of the throws 311 can extend through and engage the second sliding yoke 214b.

As illustrated in FIG. 23A, the first sliding yoke 214a can define a geometry that includes a flat portion 282 and a curved portion 284. In general, the flat portion 282 combined with the curved portion 284 can define a continuous slot within which the pin 314 can be received. In the illustrated non-limiting example, the flat portion 282 can include a first wall 286 and a second wall 288 and the pin 314 can be received between the first angled wall 220 and the second angled wall 222. The curved portion 290 can include a first curved wall 292 and a second curved wall 294 and the pin 314 can be received between the first curved wall 292 and the second curved wall 294.

As previously noted herein, the crankshaft 301 can selectively actuate the first and second poppet assemblies 200a, 200b between a first end position and a second end position. The crankshaft 301 can displace the first and second poppet assemblies 200a, 200b axially (e.g., along axis 10) between the first end position and the second end position. In the illustrated non-limiting example of FIG. 23A, rotation of the crankshaft 301 in a first direction (e.g., a clockwise direction) can bring the pin 314 into engagement with the first curved wall 292 of the first sliding yoke 214a, thereby applying a force to the first poppet assembly 200a to move from a first end position towards a second end position (e.g., a downward direction relative to the central shaft 302 from the perspective of FIG. 23A). To return to the illustrated position of FIG. 23A, rotation of the crankshaft 301 in a second direction (e.g., a counterclockwise direction) can bring the pin 314 into engagement with the second curved wall 294, thereby applying a force to the first poppet assembly 200a to move from the second end position towards the first end position (e.g., an upward direction relative to the central shaft 302 from the perspective of FIG. 23A).

Similarly, starting from the illustrated position of FIG. 23A, rotation of the crankshaft 301 in the second direction (e.g., a counterclockwise direction) can bring the pin 314 into engagement with the first wall 286, thereby applying a force to the first poppet assembly 200*a* to move from the first end position towards the second end position (e.g., the downward direction relative to the central shaft 302 from the perspective of FIG. 23A). To return to the illustrated position of FIG. 23A, rotation of the crankshaft assembly 300 in the first direction (e.g., a clockwise direction) can bring the pin 314 into engagement with the second wall 288, thereby applying a force the first poppet assembly 200*a* to move from the second end position towards the first end position (e.g., the upward direction relative to the central shaft 302 from the perspective of FIG. 23A).

As illustrated in FIG. 23B, the second poppet assembly 200*b* can include similar features as the first poppet assembly 200*a*, with similar components identified using like reference numerals with a "b" suffix, except as described herein or apparent from the figures. In the illustrated non-limiting example, the second sliding yoke 214*b* can define a geometry that can be substantially similar to the first sliding yoke 215*b*. In some non-limiting examples, the poppet carriage 260*a* of the first poppet assembly 200*a* can be identical to the poppet carriage 260*b* of the second poppet assembly 200*b*, but the poppet carriage 260*b* may be in a different orientation (e.g., rotated, flipped, etc.).

In the illustrated non-limiting example, the second sliding yoke 214*b* can define a continuous slot within which the pin 314 can be received. In the illustrated non-limiting example, the second sliding yoke 214*b* can include a flat portion 296 and a curved portion 299. The flat portion 296 can include a first wall 297 and a second wall 298. In the illustrated non-limiting example of FIG. 23B, rotation of the crankshaft 301 in a first direction (e.g., a clockwise direction) can result in the pin 314 traveling along the curved portion 299, thereby maintaining the second poppet assembly 200*b* in a first end position. A subsequent rotation of the crankshaft 301 in a second direction (e.g., a counterclockwise direction) can result in the pin 314 again traveling along the curved portion 299 back to the illustrated position of FIG. 23B. The movement of the pin 314 traveling back along the curved portion 299 allows the second poppet assembly 200*b* to remain in the first end position.

Alternatively, starting from the illustrated position of FIG. 23B, rotation of the crankshaft 301 in the second direction (e.g., the counterclockwise direction) can bring the pin 314 into engagement with the first wall 297, thereby applying a force to the second poppet assembly 200*b* to move from the first end position towards a second end position (e.g., the downward direction relative to the central shaft 302 from the perspective of FIG. 23B). To return to the illustrated position of FIG. 23B, rotation of the crankshaft 301 in the first direction (e.g., the clockwise direction) can bring the pin 314 into engagement with the second wall 298, thereby applying a force to the second poppet assembly 200*b* to move from the second end position towards the first end position (e.g., the upward direction relative to the central shaft 302 from the perspective of FIG. 23B).

One non-limiting example of operation of the valve assembly 100 will be described with reference to FIGS. 23A-24. In general, the integration of the torque reduction device (not shown) can enable the poppet assemblies 200 to define multi-stable functionality. As previously described herein, the first poppet assembly 200*a* and the second poppet assembly 200*b* can define a bi-stable functionality, which enables the valve assembly 100 to be operable in a plurality of configurations to provide varying flow paths. For example, each of the first poppet assembly 200*a* and the second poppet assembly 200*b* can be selectively moveable between a first end position (see FIG. 24) and a second end position (not shown). In some non-limiting examples, each of the first poppet assembly 200*a* and the second poppet assembly 200*b* can be individually and selectively moveable between a first end position (see FIG. 24) and a second end position (not shown) depending on a direction of rotation of the crankshaft 301 and the geometry defined by the first and second sliding yokes 214*a*, 214*b*.

In the non-limiting example illustrated in FIGS. 23A-24, the valve assembly 100 can be selectively actuated between a first configuration (FIG. 24), a second configuration (not shown), and a third configuration (not shown). FIG. 24 illustrates the valve assembly 100 in a first configuration, where the first poppet assembly 200*a* and the second poppet assembly 200*b* are in a first end position and the crankshaft 301 is in a neutral position. As previously described herein, actuation of the crankshaft 301 in a desired direction at a predetermined magnitude can selectively actuate the valve assembly 100, including the first and second poppet assemblies 200*a*, 200*b*, between the first configuration, the second configuration, and the third configuration.

In the non-limiting example illustrated in FIG. 24, the valve assembly 100 can be selectively actuated between a first configuration, a second configuration, and a third configuration. FIG. 24 illustrates the valve assembly 100 in a first configuration, where the first poppet assembly 200*a* and the second poppet assembly 200*b* are in a first end position and the crankshaft 301 is in a neutral position. In a second configuration, the first poppet assembly 200*a* and the second poppet assembly 200*b* can be in the second end position, opposite the first end position. Actuation of the crankshaft 301 in a desired direction at a predetermined magnitude can actuate the valve assembly 100 between the first configuration and the second configuration. In the illustrated non-limiting example, a rotation of the crankshaft 301 in the second direction (e.g., a counterclockwise direction) can actuate the first poppet assembly 200*a* and the second poppet assembly 200*b* from the first end position toward the second end position. During the rotation of the crankshaft 301, one of the pins 314 engages the flat portion 282 of the first sliding yoke 214*a* and one of the pins 314 engages the flat portion 296 of the second sliding yoke 214*b*. In this way, for example, the first poppet assembly 200*a* and the second poppet assembly 200*b* are axially displaced toward the second end position. The first poppet assembly 200*a* and the second poppet assembly 200*b* continue to displace toward the second end position via input from the crankshaft 301 until the first poppet assembly 200*a* and the second poppet assembly 200*b* reach the second end position.

In a third configuration, the first poppet assembly 200*a* can be in the second end position and the second poppet assembly 200*b* can be in the first end position. Actuation of the crankshaft 301 in a desired direction at a predetermined magnitude can actuate the valve assembly 100 between the first configuration and the third configuration. In the illustrated non-limiting example, a rotation of the crankshaft 301 in the first direction (e.g., a clockwise direction) can actuate the first poppet assembly 200*a* from the first end position towards the second end position and the second poppet assembly 200*b* can be maintained in the first end position.

If the valve assembly 100 is in the first configuration, the rotation of the crankshaft assembly 300 in the first direction can result in one of the pins 314 engaging the curved portion 284 of the first sliding yoke 214*a*, and one of the pins 314 traveling along the curved portion 299 of the second sliding yoke 214*b*. In this way, for example, the first poppet assembly 200*a* can be axially displaced toward the second end position and the second poppet assembly 200b can maintain its position in the first end position.

If the valve assembly 100 is in the second configuration, a rotation of the crankshaft assembly 300 in the first direction can result in one of the pins 314 engaging the flat portion 282 of the first sliding yoke 214a (e.g., the second wall 288) and one of the pins 314 engaging the flat portion of the second sliding yoke 214b (e.g., the second wall 298). In this way, for example, the first poppet assembly 200a and the second poppet assembly 200b can be axially displaced toward the first end position. The first poppet assembly 200a and the second poppet assembly 200b continue to displace toward the first end position via input from the crankshaft 301 until the first poppet assembly 200a and the second poppet assembly 200b reach the first end position. At this condition, the valve assembly 100 can be in the first configuration and the continued rotation of the crankshaft assembly 300 can displace the first poppet assembly 200a back to the second end position, while the second poppet assembly 200b is maintained in the first end position due to the pin 314 of the crankshaft 301 traveling along the curved portion 299.

In the illustrated non-limiting example, the crankshaft 301 and a torque reduction device (not shown) can maintain the first poppet assembly 200a and the second poppet assembly 200b in the first or second end positions. As previously described herein, even in the absence of the compliant members, the torque reduction device and/or the pressure forces on a poppet can provide a multi-stable functionality to the valve assembly 100.

Figure 25:
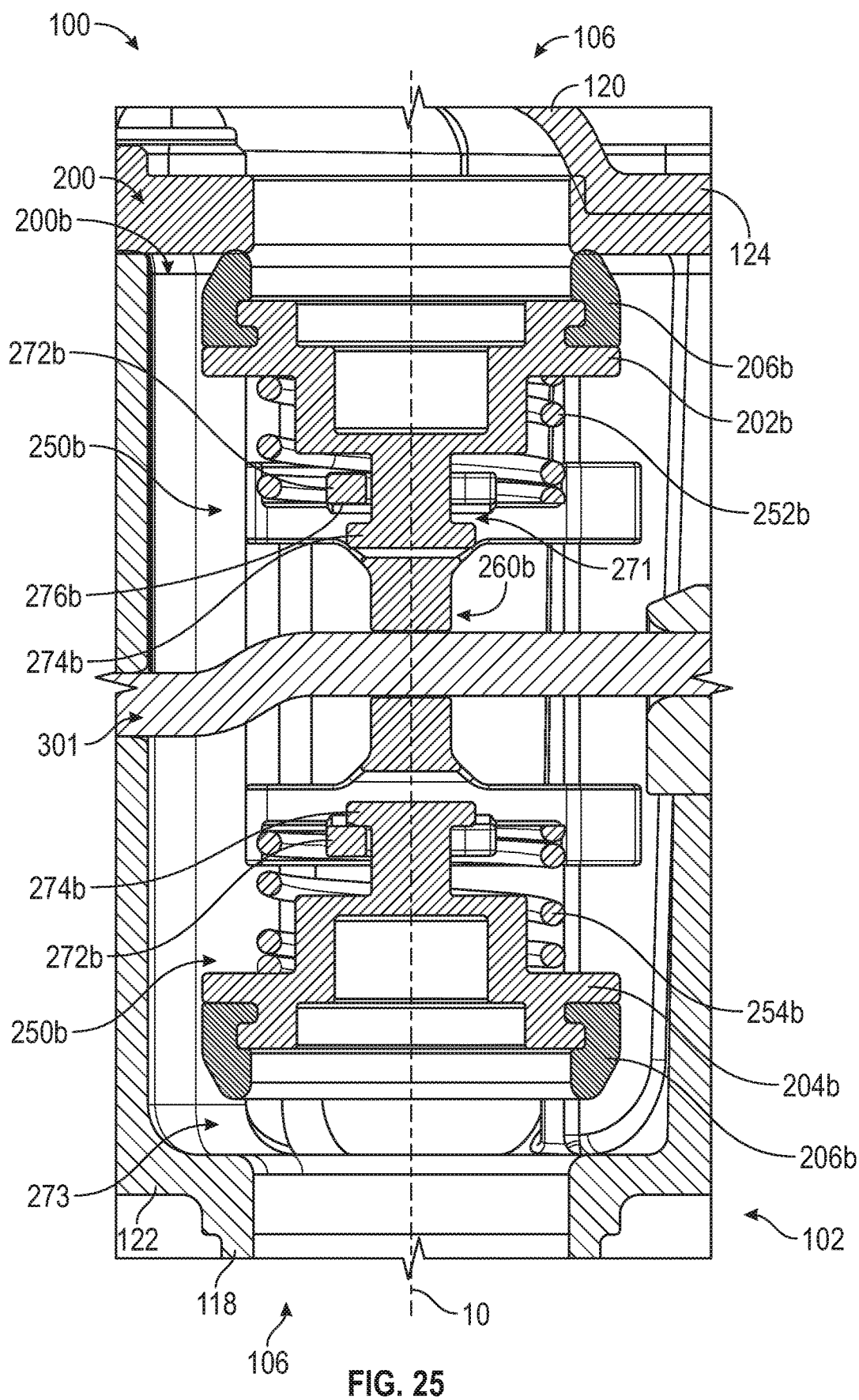
FIG. 25 is a detail view of the cross-section of FIG. 24.

Referring now to FIG. 25, the second poppet assembly 200b is illustrated in the first end position. The arrangement of the springs 250b between the poppet carriage 260b and the first and second poppets 202b, 204b can allow for a larger gap between a poppet and the inside of the valve housing 102. For example, the when the second poppet assembly 200b is actuated from the second end position to the first end position, the poppet seal 206b can come in contact with the inside of the valve housing 102. The crankshaft 301 can continue to axially displace the poppet carriage 260b toward the first end position, thereby compressing the first coil spring 252b. The compression of the first coil spring 252b can result in a gap 271 to form between the flange 274b of the first poppet 202b and the inner surface 276b of the U-shaped slot 272b of the poppet carriage 260b.

Simultaneously, the second poppet 204b can be lifted off of the inside of the valve housing 102, thereby forming a gap 273 between the poppet seal 206b of the second poppet 204b and an inside of the valve housing 102. As the first coil spring 252b begins to compress, the size of the gap 273 (e.g., the axial height) can increase. This compliance or relative axial motion between the first and second poppets 202b, 204b can allow for larger flow areas between a poppet and a port without increasing the vertical size (e.g., from the perspective of FIG. 25) of the valve housing 102.

Figure 26:
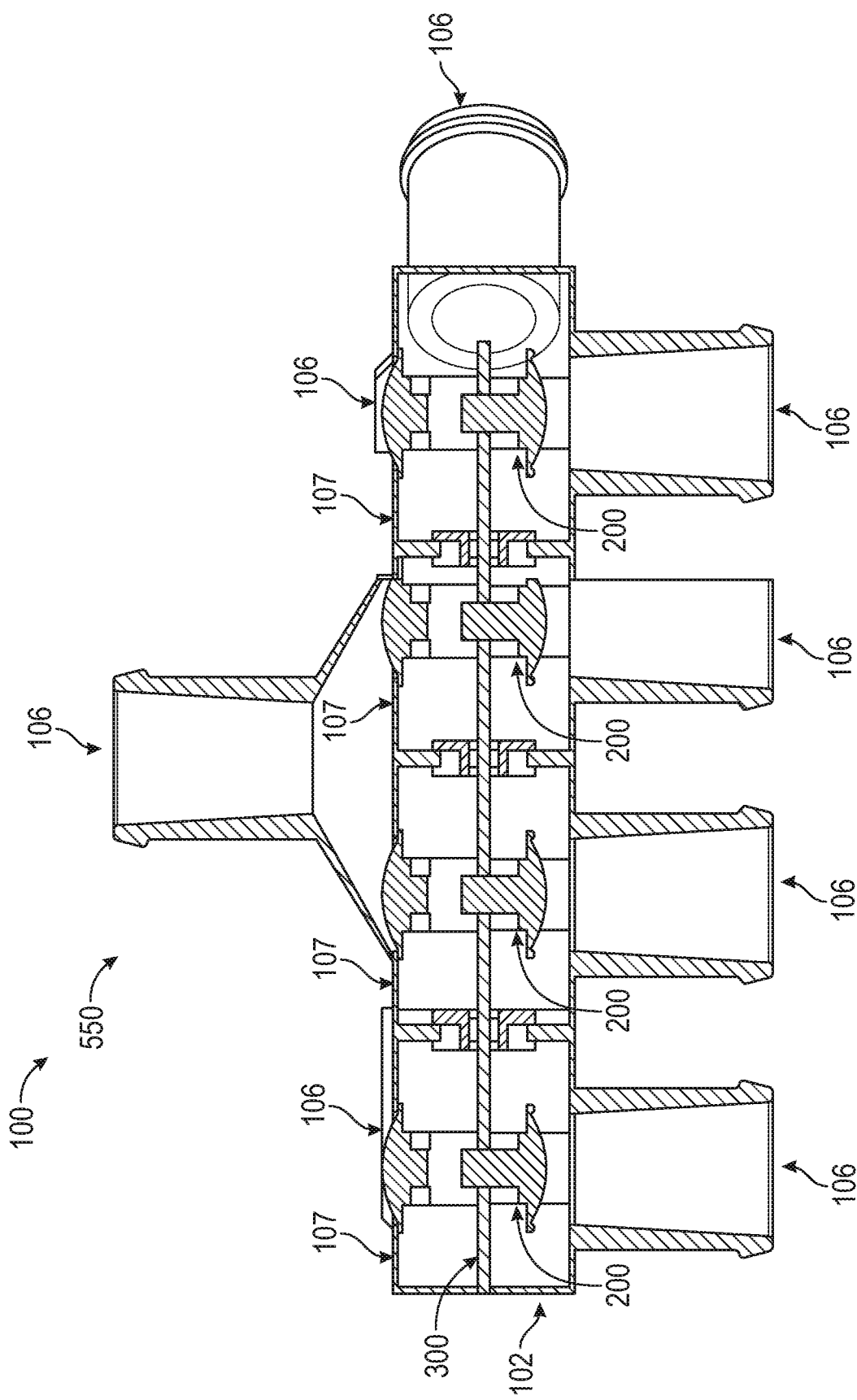
FIG. 26 is a cross-sectional view of a valve assembly with a plurality of valve sections and poppet assemblies arranged in series.
Figure 27:
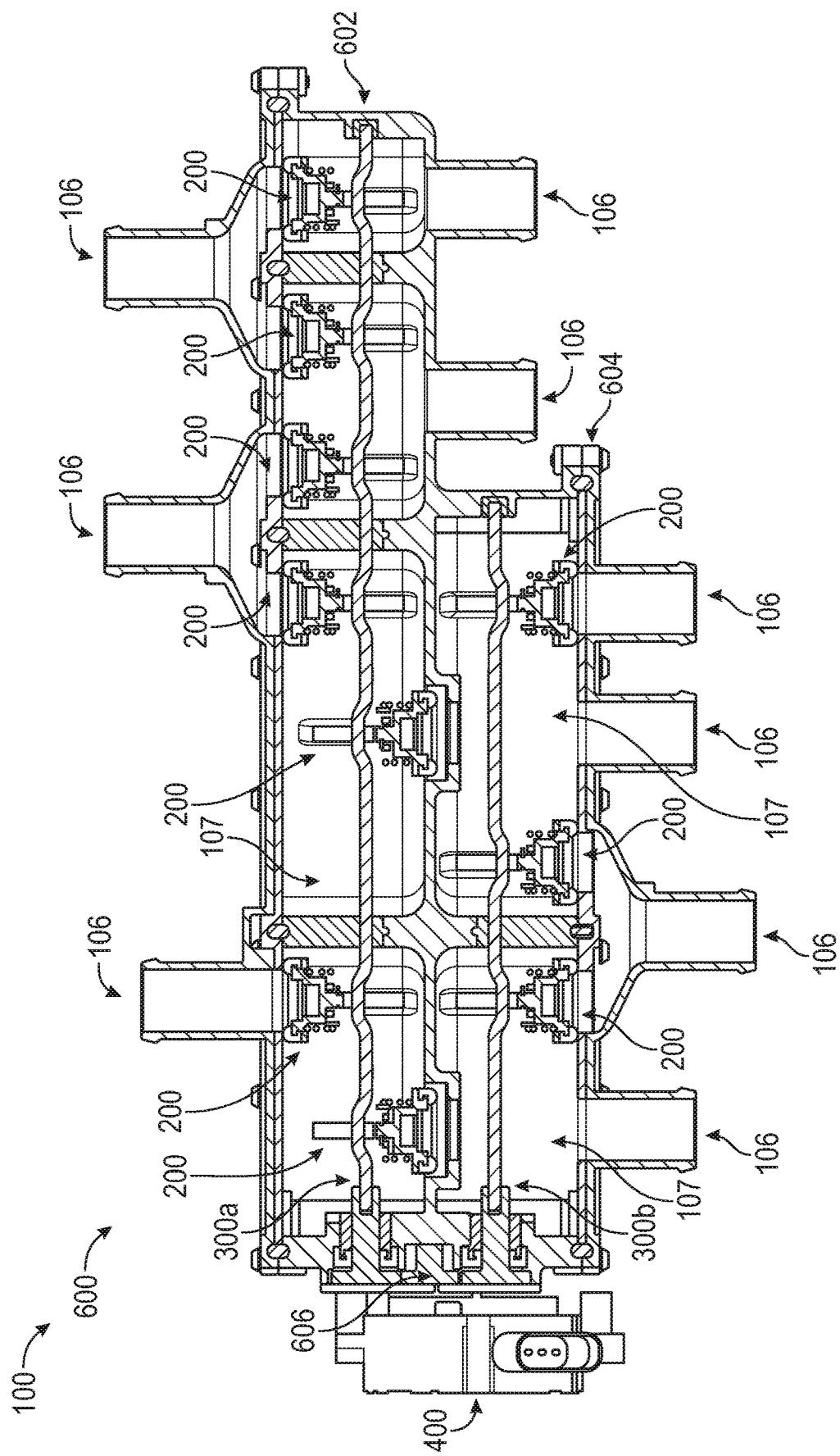
FIG. 27 is a cross-sectional view of a valve assembly with a plurality of valve sections and poppet assemblies arranged in parallel.

Referring now to FIGS. 26-27, the previous illustrated non-limiting examples of valve assemblies included two valve sections with a poppet assembly arranged within each valve section. In other non-limiting examples, a valve assembly can include more or less than two valve sections, with the crankshaft assembly 300 being modified to actuate a number of poppet assemblies that can correspond with the number of valve sections. For example, FIG. 26 illustrates a non-limiting example of a valve assembly 550 that includes a plurality of valve sections 107 (e.g., four valve sections) arranged in series, where each valve section 107 includes a poppet assembly 200. As illustrated in FIG. 26, the crankshaft assembly 300 can engage and actuate each of the plurality of poppet assemblies 200 within the valve assembly 550.

It should be appreciated that other configurations are also possible. For example, a plurality of poppet assemblies can be placed in series, but driven by two or more independent crankshaft assemblies. Alternatively, the plurality of poppet assemblies can be placed in parallel or include a mixing of fluid between adjacent poppet assemblies. In this way, the poppet assemblies can include of one or more banks of poppet assemblies that are parallel to each other. For example, FIG. 27 illustrates a valve assembly 600 that can include a first bank 602 of poppet assemblies 200 coupled to a first common crankshaft 300a and a second bank 604 of poppet assemblies 200 coupled to a second common crankshaft 300b. The first and second banks 602, 604 can be driven independently, via the first common crankshaft 300a and the second common crankshaft 300b, respectively. In the illustrated non-limiting example, the first and second banks 602, 604 can be driven together, via a gear, sprocket, chain, belt, or pulley coupling 606 between the first common crankshaft 300a and the second common crankshaft 300b. In addition, in the illustrated non-limiting example, only one poppet may be utilized in each poppet assembly. For example, each poppet assembly can have a poppet carriage, a poppet, and a spring coupled between the poppet carriage and the poppet.

In some non-limiting examples, the valve assemblies described herein can be implemented in coolant applications, refrigerant applications, oil applications, water applications, fuel applications, air applications, or other gaseous or liquid fluid applications. Other non-limiting application can include a valve that can be used as a flow diverting valve, an on/off valve (such as a bi-stable valve), or a proportional valve.

Within this specification embodiments have been described in a way which enables a clear and concise specification to be written, but it is intended and will be appreciated that embodiments can be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A valve assembly comprising:
a first poppet assembly including a first poppet;
a second poppet assembly including a second poppet; and
a crankshaft coupled to the first poppet assembly and the second poppet assembly, the second poppet assembly being axially separated from the first poppet assembly along the crankshaft;
the crankshaft being configured to selectively actuate the first poppet assembly between a first end position and a second end position and selectively actuate the second poppet assembly between a third end position and a fourth end position;

wherein rotation of the crankshaft in a first direction is configured to actuate the first poppet assembly from the first end position to the second end position;

wherein rotation of the crankshaft in a second direction is configured to maintain the first poppet assembly in the first end position; and wherein the first poppet assembly includes a spring configured to bias the first poppet assembly into each of the first end position and the second end position.

2. The valve assembly of claim 1, wherein the first poppet assembly includes a third poppet arranged opposite to the first poppet and a second spring coupled to the third poppet.

3. The valve assembly of claim 1, wherein zero power input is required to maintain the first poppet assembly in the first end position or the second end position.

4. The valve assembly of claim 1, wherein the first poppet assembly includes a support structure having a slot extending through the support structure and configured to receive the crankshaft.

5. The valve assembly of claim 4, wherein the crankshaft comprises a pin slidably received within the slot of the support structure.

6. The valve assembly of claim 5, wherein the slot defines an engagement portion; and wherein engagement of the pin on the engagement portion of the slot is configured to displace the first poppet assembly.

7. The valve assembly of claim 5, wherein the slot defines an analogous portion that defines an analogous shape that is similar to a shape of at least a portion of a displacement path traversed by the pin, and wherein displacement of the pin along the analogous portion is configured to maintain the first poppet assembly in at least one of the first end position and the second end position.

8. The valve assembly of claim 7, wherein the analogous portion of the slot defines a curved portion;

wherein the curved portion defines a geometry that is concentric to the crankshaft; and wherein when the crankshaft is rotated in the second direction, the pin of the crankshaft travels along the curved portion.

9. The valve assembly of claim 8, wherein rotation of the pin along the curved portion maintains a position of the first poppet assembly.

10. A valve assembly comprising:
a poppet assembly including a first poppet and a poppet support structure;
a slot extending through the poppet support structure;
a crankshaft configured to actuate the poppet assembly between a first end position and a second end position;
wherein the crankshaft includes a pin that is slidably coupled to the slot;
wherein the slot defines a geometry that is configured to selectively displace the poppet assembly upon displacement of the crankshaft relative to the slot;
wherein the geometry of the slot defines a curved portion;
wherein rotation of the pin along the curved portion maintains a position of the poppet assembly; and
wherein the curved portion of the slot defines an arcuate geometry that is concentric to the crankshaft.

11. The valve assembly of claim 10, wherein the slot includes an engagement portion and an analogous portion.

12. The valve assembly of claim 11, wherein the engagement portion defines a shape that intersects with at least a portion of a displacement path of the pin so that the pin engages the engagement portion of the slot to selectively displace the poppet assembly.

13. The valve assembly of claim 11, wherein the analogous portion defines a shape that conforms to at least a portion a displacement path of the pin so that the pin travels along the analogous portion and maintains the poppet assembly in the first end position or the second end position.

14. The valve assembly of claim 13, wherein zero power input is required to maintain the poppet assembly in the first end position or the second end position.

15. The valve assembly of claim 10, wherein the geometry of the slot defines an engagement portion;

wherein the engagement portion of the slot is at an angle between 0 and 180 degrees with respect to an axis defined by the poppet support structure; and wherein when the pin engages the engagement portion of the slot, the crankshaft displaces the poppet assembly.

16. The valve assembly of claim 10, wherein the poppet assembly includes a first spring coupled to the first poppet.

17. The valve assembly of claim 16, wherein the poppet assembly includes a second poppet arranged opposite to the first poppet and a second spring coupled to the second poppet.

* * * * *